US007411198B1

(12) United States Patent
Holland et al.

(10) Patent No.: US 7,411,198 B1
(45) Date of Patent: Aug. 12, 2008

(54) INTEGRATOR CIRCUITRY FOR SINGLE CHANNEL RADIATION DETECTOR

(75) Inventors: Samuel D. Holland, Houston, TX (US); Paul B. Delaune, Alvin, TX (US); Kathryn M. Turner, League City, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 246 days.

(21) Appl. No.: 11/421,174

(22) Filed: May 31, 2006

(51) Int. Cl.
*G01T 1/24* (2006.01)
*G06G 7/12* (2006.01)

(52) U.S. Cl. ............................ 250/370.01; 250/370.02; 250/370.08; 250/370.09; 327/230; 327/345; 327/363

(58) Field of Classification Search ................................ 250/370.01–370.11; 327/5, 16, 73, 137, 327/230, 345, 363
See application file for complete search history.

(56) References Cited

U.S. PATENT DOCUMENTS

| | | | | |
|---|---|---|---|---|
| 4,078,178 | A | 3/1978 | Lowes | |
| 4,217,497 | A | 8/1980 | Daniels et al. | |
| 4,395,635 | A | 7/1983 | Friauf et al. | |
| 4,476,386 | A | 10/1984 | Reid et al. | |
| 4,491,799 | A | 1/1985 | Giardinelli | |
| 4,810,959 | A | 3/1989 | Padawer | |
| 4,870,603 | A | 9/1989 | Padawer | |
| 5,067,090 | A | 11/1991 | Seeman | |
| 5,142,286 | A | 8/1992 | Ribner et al. | |
| 5,347,129 | A | 9/1994 | Miller et al. | |
| 5,493,122 | A | 2/1996 | Farr | |
| 5,574,284 | A | 11/1996 | Farr | |
| 5,684,850 | A | 11/1997 | Warburton et al. | |
| 5,873,054 | A | 2/1999 | Warburton et al. | |
| 6,064,054 | A | 5/2000 | Waczynski et al. | |
| 6,222,175 | B1 | 4/2001 | Krymski | |
| 6,380,790 | B1 | 4/2002 | Denison | |
| 6,570,432 | B2 | 5/2003 | Denison | |
| 6,573,762 | B1 * | 6/2003 | Wessendorf et al. | ........ 327/100 |

(Continued)

OTHER PUBLICATIONS

DM Binkley, BS Puckett, ME Casey, R Lecomte, and A Saoudi, "A Power Efficient, Low Noise, Wideband, Integrated CMOS Preamplifier for LSO/APD PET Systems," Nuclear Science Symposium, IEEE, 1999.*

(Continued)

*Primary Examiner*—David P. Porta
*Assistant Examiner*—Casey Bryant
(74) *Attorney, Agent, or Firm*—Theodore U. Ro

(57) ABSTRACT

Input circuitry is provided for a high voltage operated radiation detector to receive pulses from the detector having a rise time in the range of from about one nanosecond to about ten nanoseconds. An integrator circuit, which utilizes current feedback, receives the incoming charge from the radiation detector and creates voltage by integrating across a small capacitor. The integrator utilizes an amplifier which closely follows the voltage across the capacitor to produce an integrator output pulse with a peak value which may be used to determine the energy which produced the pulse. The pulse width of the output is stretched to approximately 50 to 300 nanoseconds for use by subsequent circuits which may then use amplifiers with lower slew rates.

29 Claims, 12 Drawing Sheets

U.S. PATENT DOCUMENTS

| | | | | |
|---|---|---|---|---|
| 6,609,075 | B1 | 8/2003 | Warburton et al. | |
| 6,653,636 | B2 | 11/2003 | Busse et al. | |
| 6,703,959 | B2 | 3/2004 | Kuwabara | |
| 6,917,041 | B2 | 7/2005 | Doty et al. | |
| 7,211,803 | B1 * | 5/2007 | Dhurjaty et al. ........ | 250/370.09 |
| 2003/0146389 | A1 | 8/2003 | Busse et al. | |
| 2004/0026623 | A1 | 2/2004 | Doty et al. | |

OTHER PUBLICATIONS

DM Binkley, JM Rochelle, MJ Paulus, and ME Casey, "A Low-Noise, Wideband, Integrated CMOS Transimpedance Preamplifier for Photodiode," IEEE Transactions on Nuclear Science vol. 39, No. 4, 1992.*

* cited by examiner

INTEGRATOR CIRCUITRY FOR SINGLE CHANNEL RADIATION DETECTOR

ORIGIN OF THE INVENTION

The invention described herein was made by employee(s) of the United States Government and may be manufactured and used by or for the Government of the United States of America for governmental purposes without the payment of any royalties thereon or therefore.

BACKGROUND OF THE INVENTION

1. Field of the Invention

The present invention relates generally to radiation detectors and, more particularly, to integrator circuitry and circuitry related thereto for providing a single channel circuit for a radiation detector.

2. Description of Related Art

Electronic circuits for radiation detectors have been utilized for over a century for the purpose of detecting pulses produced in a radiation sensor element as a result of impingement by some type of radiation. Presently, two channel radiation detection circuits are commonly utilized when it is desired to detect high energy and low energy pulses from the same radiation detector. The two channel radiation detection circuits require two separate circuits with different gains and threshold settings thereby requiring significant cost and reducing reliability. The inventors propose that it would be desirable to be able to process high energy and low energy pulses in a single channel.

Most modern radiation detectors depend on scintillation crystals, ion chambers, or semiconductor radiation detectors. Scintillation crystals respond to radiation by emitting a photon of light proportional to the energy of the charged particle that is stopped in the crystal. The most recent class of detector developed is the solid-state detector. These detectors convert the incident charged particles directly into electrical pulses. Solid-state detectors are fabricated from a variety of materials including: germanium, silicon, cadmium telluride, mercuric iodide, and cadmium zinc telluride. The best radiation detector for a given application will depend on the requirements of the application.

The input electronic circuits for related art radiation detectors are then designed around the type of radiation sensor utilized in the radiation detector. Therefore related art radiation detector circuitry is limited in flexibility of use with different radiation detectors. The inventors propose that it would be desirable to provide a universal detector circuit that may be utilized with many different types of detectors and require only a single channel for both high energy and low energy radiation events. Related art radiation detector circuitry are limited in various ways such as the two channel configuration and in other ways as discussed hereinafter that hinder or prevent this function.

In many cases, multiple radiation detectors are used simultaneously. Related art circuitry for multiple radiation detector systems not only tend to produce less accurate data, and require the more bulky two channel layout, but are also likely to miss data such as coincident detection of radiation particles from different radiation detectors. The related art designs require a computer or processor to poll, sample, and store data from multiple radiation detection circuit boards and thereby may provide limited data collection when multiple radiation events are detected in different detectors simultaneously or near simultaneously. Related art designs also require specialized connections that prevent reconfiguration of suites of radiation detectors.

The following patents disclose related art efforts related to the above-described and/or other problems and studies:

U.S. Pat. No. 4,078,178, issued Mar. 7, 1978, to Lowes, discloses a dynamic background subtraction circuit which improves the display resolution of radiation energy spectra, such as X-ray energy spectra in an X-ray energy spectrometer. In this circuit, the number of radiation events (counts) occurring at a reference or background energy level is subtracted from the number of radiation events (counts) occurring at a second energy level under study. The output of this circuit is a real-time (dynamic) approximation of the count rate at the energy level under study, but with resolution improved by subtraction of the background counts.

U.S. Pat. No. 4,217,497, issued Aug. 12, 1980, to Daniels et al, discloses a portable neutron spectrometer/kerma-rate meter for the measurement of the fast neutron component of mixed n-gamma fields in the 1 to 15 MeV neutron energy range. The system includes an organic scintillation detector, pulse shape discrimination circuitry, a 1.4 μs multichannel analyzer, an 8-bit microcomputer, and appropriate displays. The instrument is capable of both gathering and processing recoil-proton pulse-height data in the field.

U.S. Pat. No. 4,395,635, issued Jul. 26, 1983, to Friauf et al, discloses a gamma ray coincidence analysis system for a multichannel nuclear imaging device of the type employing scintillation detectors in ring-like arrays, with the detectors arranged in quadrants of the rings. The scintillation detectors in a ring have output circuits including respective timing discriminators and OR gates, and respective energy discriminators providing delayed energy pulses, and wherein timing pulses from the respective quadrants are fed via the OR gates to the inputs of a four-input coincidence detector without any delay except for a small delay internal to the discriminators and the very small delay of the OR gates. The delay of the energy pulses at the energy discriminators is for an energy validation period of 500 nsec. The output pulse from the coincidence detector is subsequently delayed for a similar period for verification of the energy levels of the two channels causing the coincidence. A data output signal is generated responsive to the concurrence of the delayed coincidence signal and the delayed energy verification pulses.

U.S. Pat. No. 4,476,386, issued Oct. 9, 1984, to Reid et al, discloses a method and apparatus for material analysis in which X-rays generated pursuant to incidence of an electron beam on the material are detected by a detector which generates signals representative of X-ray intensity. A first single analyzer is connected to receive the signals from the detector and to pass to an associated first counter a count signal whenever the signal applied to the first single channel analyzer is representative of an X-ray energy within a relatively narrow range of such energies. A second single channel analyzer is also connected to receive the signals from the detector and to pass to an associated second counter a count signal whenever the signal applied to the second analyzer is representative of an X-ray energy falling within a much broader range of such energies than the first mentioned range. The first and second counters accumulate the count signals applied thereto. The count in the second counter is compared by a comparator with a pre-established count in a third counter and when the count in the second counter assumes the same value as the count in the third counter the counts in the first and second counters are held. The so held count in the first counter then itself represents a normalized ratio of X-ray energy within the narrow range to the X-ray energy for the energy spectrum represented by the broad range of energies. On the basis of this normalized ratio information as to the makeup of the material can be derived.

U.S. Pat. No. 4,491,799, issued Jan. 1, 1985, to Giardinelli, discloses a device consisting essentially of a sampler device for sampling the baseline after every pulse processed in the spectroscopy amplifier, coupled to an averager circuit for averaging the samples, and to a LED display device, coupled to the average output and giving a visual indication of the value and sign of the averager output signal, the sampler and average circuits forming a so-called "boxcar integrator", that is an essentially RC low-pass filter having a switch in series to the resistor.

U.S. Pat. No. 4,810,959, issued Mar. 7, 1989, to Padawer, discloses an invention that detects pulses, and, in response thereto, generates ramp functions with amplitudes corresponding to the interarrival times between successive pulses. These amplitudes are measured, and the occurrence of identical amplitudes are accumulated in corresponding memory locations, each of which has an address corresponding to a particular interarrival time. The resultant memory contents define a population distribution of interarrival times which is an exponential decay function of interarrival time. Interarrival times exceeding a preselected value are disregarded.

U.S. Pat. No. 4,870,603, issued Sep. 26, 1989, to Padawer, discloses an invention that detects pulses, and, in response thereto, generates ramp functions with amplitudes corresponding to the interarrival times between successive pulses. These amplitudes are measured, and the occurrence of identical amplitudes are accumulated in corresponding memory locations, each of which has an address corresponding to a particular interarrival time. The resultant memory contents define a population distribution of interarrival times which is an exponential decay function of interarrival time. Interarrival times exceeding a preselected value are disregarded.

U.S. Pat. No. 5,067,090, issued Nov. 19, 1991, to Seeman, discloses a nuclear spectroscopy method for pulse height analysis of an electrical signal emitted by a radiation detector and including nuclear events, such as pulses, whose amplitude is a measure of the energy of the gamma rays collected by said radiation detector, wherein (1) said signal is continuously converted to digital samples, at a given rate, and (2) each of the digital samples is processed so as to form a digital image of each detected pulse. The energy of each pulse is calculated by summing all sample values representative of this pulse and the sample just preceding the first sample representative of a pulse, as well as the sample just following the last sample representative of the same pulse.

U.S. Pat. No. 5,142,286, issued Aug. 25, 1992, to Ribner et al, discloses that sigma-delta analog-to-digital conversion is used in sensing apparatus that generates a digital signal descriptive of light energy received by a photosensor, such as one of a plurality of photosensors that together receive various elements of a radiant-energy image. A preamplifier generates an analog output signal responsive to the photocurrent of the photosensor, which analog output signal is undesirably accompanied by wideband noise. The analog output signal is supplied to a sigma-delta analog-to-digital converter, the decimation filter of which not only suppresses in the digital signal a component arising from the quantization noise from the sigma-delta modulator portion of the analog-to-digital converter, but also suppresses a component arising from remnant wideband noise from the preamplifier.

U.S. Pat. No. 5,347,129, issued Sep. 13, 1994, to Miller et al, discloses a radiation detection system that determines the type of nuclear radiation received in a detector by producing a correlation value representative of the statistical cross correlation between the shape of the detector signal and pulse shape data previously stored in memory and characteristic of respective types of radiation. The correlation value is indicative of the type of radiation. The energy of the radiation is determined from the detector signal and is used to produce a spectrum of radiation energies according to radiation type for indicating the nature of the material producing the radiation.

U.S. Pat. No. 5,493,122, issued Feb. 20, 1996, to Farr, discloses an energy-resolving x-ray detector for soft x-rays produced by elements having atomic numbers ranging from 9 to 23 includes a charge-coupled integrated circuit radiation detector device having an array of collection regions in a parallel plurality of collection shift registers forming columns of the array; an output amplifier for sequentially amplifying and signaling the charges received by the collection shift register; and a row shift register connected between the collection shift registers and the output amplifier; and a clock circuit having a multi-phase column output connected for sequentially shifting charges between collection regions of the collection shift register and into the row shift register during continuous exposure of the array to incoming radiation, each of the charges received by the output amplifier being sequentially accumulated in each of the collection regions of one collection shift register in response to the radiation, the clock circuit also having a multi-phase row output connected for sequentially shifting the charges from the row shift register to the output amplifier, the output amplifier having a reset connection to the clock circuit for momentarily resetting the input to the output amplifier at a predetermined level prior to receipt of each of the charges into the output amplifier. The output amplifier feeds an analog signal chain providing correlated double sampling. A spectrometer and thickness measurement apparatus suitable for monitoring silicone coatings includes the detector.

U.S. Pat. No. 5,574,284, issued Nov. 12, 1996, to Farr, discloses an energy-resolving x-ray detector for soft x-rays produced by elements having atomic numbers ranging from 9 to 23. The detector includes a charge-coupled integrated circuit radiation detector device having an array of collection regions in a parallel plurality of collection shift registers forming columns of the array; an output amplifier for sequentially amplifying and signaling the charges received by the collection shift register; and a row shift register connected between the collection shift registers and the output amplifier; and a clock circuit having a multi-phase column output connected for sequentially shifting charges between collection regions of the collection shift register and into the row shift register during continuous exposure of the array to incoming radiation, each of the charges received by the output amplifier being sequentially accumulated in each of the collection regions of one collection shift register in response to the radiation, the clock circuit also having a multi-phase row output connected for sequentially shifting the charges from the row shift register to the output amplifier, the output amplifier having a reset connection to the clock circuit for momentarily resetting the input to the output amplifier at a predetermined level prior to receipt of each of the charges into the output amplifier. The output amplifier feeds an analog signal chain providing correlated double sampling. A spectrometer and thickness measurement apparatus suitable for monitoring silicone coatings.

U.S. Pat. No. 5,684,850, issued Nov. 4, 1997, to Warburton et al, discloses a high speed, digitally based, signal processing system which accepts input data from a detector-preamplifier and produces a spectral analysis of the x-rays illuminating the detector. The system achieves high throughputs at low cost by dividing the required digital processing steps between a "hardwired" processor implemented in combinatorial digital logic, which detects the presence of the x-ray signals in the digitized data stream and extracts filtered estimates of their amplitudes, and a programmable digital signal processing computer, which refines the filtered amplitude estimates and bins them to produce the desired spectral analysis. One set of algorithms allow this hybrid system to match the resolution of analog systems while operating at much higher data rates. A second set of algorithms implemented in the processor allow the system to be self-calibrating as well. The same processor also handles the interface to an external control computer.

U.S. Pat. No. 5,873,054, issued Feb. 16, 1999, to Warburton et al, discloses a high speed, digitally based, signal processing system which accepts a digitized input signal and detects the presence of step-like pulses in the this data stream, extracts filtered estimates of their amplitudes, inspects for pulse pileup, and records input pulse rates and system lifetime. The system has two parallel processing channels: a slow channel, which filters the data stream with a long time constant trapezoidal filter for good energy resolution; and a fast channel which filters the data stream with a short time constant trapezoidal filter, detects pulses, inspects for pileups, and captures peak values from the slow channel for good events. The presence of a simple digital interface allows the system to be easily integrated with a digital processor to produce accurate spectra at high count rates and allow all spectrometer functions to be fully automated. Because the method is digitally based, it allows pulses to be binned based on time related values, as well as on their amplitudes, if desired.

U.S. Pat. No. 6,064,054, issued May 16, 2000, to Waczynski et al, discloses a radiation detector which includes a photoconductive detector and a modulator which modulates radiation passing to the photoconductive detector from a radiation source. An AC bias source is connected to the photoconductive detector and provides at least two levels of bias thereto. The modulator supplies synchronization signals to the AC bias source such that the level of bias supplied to the photoconductive detector is synchronized to the modulation of the radiation by the modulator. An integrator is connected to and receives an output signal generated by the photoconductive detector.

U.S. Pat. No. 6,222,175, issued Apr. 24, 2001, to Krymski, discloses a CMOS imager that includes an array of CMOS active pixel sensors and multiple column readout circuits each of which is associated with a respective column of sensors in the array and can perform correlated double sampling of values from a sensor in the respective column. Each column readout circuit also includes a crowbar switch which selectively can be enabled to force the stored values to an operational amplifier-based charge sensing circuit via a pair of buses. The operational amplifier-based charge sensing circuit, which includes a pair of switched integrators each of which is coupled to one of the buses, provides a differential output based on the values stored by a selected one of the column readout circuits.

U.S. Pat. No. 6,380,790, issued Apr. 30, 2002, to Denison, discloses an apparatus that includes a switching circuit, an integrator circuit having an input for receiving a first signal from the switching circuit, a sensing circuit having an input for receiving a second signal from the integrator circuit, and a control circuit having an input for receiving a third signal from the sensing circuit and an output for sending a fourth signal to the switching circuit. In certain applications, the integrator circuit includes a first integrator and a second integrator having an inverting terminal connected to an inverting terminal of the first integrator. The second integrator also includes a non-inverting terminal connected to an output of the first integrator through a first capacitor, and an output connected to a non-inverting terminal of the first integrator through a second capacitor.

U.S. Pat. No. 6,570,432, issued May 27, 2003, to Denison, discloses integrator circuit topologies that enable continuous integration without reset of the integrator circuit. One such integrator circuit includes a first integrator and a second integrator, each of the two integrators having a non-inverting terminal. Each of the non-inverting terminals is connected to an input node to alternately receive an input current for continuous integrator circuit integration without integrator circuit reset. The inverting terminal of the second integrator can be connected to an inverting terminal of the first integrator. The non-inverting terminal of the second integrator can be connected to an output of the first integrator through a first capacitor, and an output of the second integrator can be connected to a non-inverting terminal of the first integrator through a second capacitor. With such a capacitor connection, the capacitors alternately charge and discharge, based on integrator input current that is alternately directed between the non-inverting terminals of the integrators.

U.S. Pat. No. 6,609,075, issued Aug. 19, 2003, to Warburton et al, discloses techniques for measuring the baseline of the energy filter in nuclear and other spectrometers that filter pulses output by a preamplifier to measure the energy of events occurring in a detector connected to the preamplifier. These spectrometers capture the peak amplitudes of the filtered pulses as estimates of the underlying event energies and subtract a baseline value from these captured peak values in order to compensate for the energy filter's non-zero amplitude in the absence of any preamplifier output pulses. A second, baseline filter is connected to the preamplifier's output, where the basewidth of this baseline filter is significantly shorter than that of the energy filter. Times are determined when the baseline filter is not filtering preamplifier output pulses, output values from the baseline filter are captured during such determined times, and these baseline values captured from the baseline filter are used to create an accurate estimate of the energy filter's baseline value. Because the baseline filter's basewidth is much shorter than the energy filter's basewidth, large numbers of valid baseline filter values can be reliably captured at very high input count rates where it becomes difficult to capture baseline samples from the energy filter itself. It thus becomes possible to maintain the spectrometer's energy resolution and peak location stability to count rates four or more times higher than is possible without the method. The technique can be applied to both digital and analog spectrometers.

U.S. Pat. No. 6,653,636, issued Nov. 25, 2003, to Busse et al, and U.S. Patent Publication No. 2003/0146389, published Aug. 7, 2003, to Busse et al, discloses a sensor and a method of operating a sensor with includes a plurality of sensor elements (10), each of which includes a radiation-sensitive conversion element (1) which generates an electric signal in dependence on the incident radiation, and also with means (21 to 26) for amplifying the electric signal in each sensor element (10) and a read-out switching element (30) in each sensor element (10) which is connected to a read-out line (8) in order to read-out the electric signal. In order to provide a sensor in which a high stability of the transfer function and a favorable signal-to-noise ratio are ensured while maintaining a comparatively simple and economical construction, the means for amplifying include a respective source follower transistor (21) whose gate is connected to the conversion element (1), whose source is connected on the one side to an active load (23) and on the other side to one side of a sampling capacitor (26), the other side of the sampling capacitor (26) being connected to the read-out line (8) via the read-out switching element (30), a respective reset element (27) being connected to the conversion element (1) so as to reset the conversion element (1) to an initial state.

U.S. Pat. No. 6,703,959, issued Mar. 9, 2004, to Kuwabara, discloses a signal detecting method of repeating the processes of initiating accumulation of charge signals by switching an integrating amplifier to an accumulator mode, retaining a first electric signal outputted from the integrating amplifier immediately after switching to the accumulator mode, finding a difference as a signal component between a second electric signal outputted from the integrating amplifier immediately before switching to a reset mode after completing accumulation of the charge signals and the first electric signal, and converting and outputting the signal component into a digital signal. Here, the signal component concerning a first charge signal is retained by second signal retaining means and then converted into the digital signal. Further, the integrating amplifier is switched to the accumulator mode after completing accumulation concerning the first charge signal but before completing conversion into the digital signal to initiate accumulation concerning a second charge signal.

U.S. Pat. No. 6,917,041, issued Jul. 12, 2005, to Doty et al, discloses an event-driven X-ray CCD imager device that uses a floating-gate amplifier or other non-destructive readout device to non-destructively sense a charge level in a charge packet associated with a pixel. The output of the floating-gate amplifier is used to identify each pixel that has a charge level above a predetermined threshold. If the charge level is above a predetermined threshold the charge in the triggering charge packet and in the charge packets from neighboring pixels need to be measured accurately. A charge delay register is included in the event-driven X-ray CCD imager device to enable recovery of the charge packets from neighboring pixels for accurate measurement. When a charge packet reaches the end of the charge delay register, control logic either dumps the charge packet, or steers the charge packet to a charge FIFO to preserve it if the charge packet is determined to be a packet that needs accurate measurement. A floating-diffusion amplifier or other low-noise output stage device, which converts charge level to a voltage level with high precision, provides final measurement of the charge packets. The voltage level is eventually digitized by a high linearity ADC.

U.S. Patent Publication No. 2004/0026623, published Feb. 12, 2004, to Doty et al, discloses an event-driven X-ray CCD imager device that uses a floating-gate amplifier or other non-destructive readout device to non-destructively sense a charge level in a charge packet associated with a pixel. The output of the floating-gate amplifier is used to identify each pixel that has a charge level above a predetermined threshold. If the charge level is above a predetermined threshold the charge in the triggering charge packet and in the charge packets from neighboring pixels need to be measured accurately. A charge delay register is included in the event-driven X-ray CCD imager device to enable recovery of the charge packets from neighboring pixels for accurate measurement. When a charge packet reaches the end of the charge delay register, control logic either dumps the charge packet, or steers the charge packet to a charge FIFO to preserve it if the charge packet is determined to be a packet that needs accurate measurement. A floating-diffusion amplifier or other low-noise output stage device, which converts charge level to a voltage level with high precision, provides final measurement of the charge packets. The voltage level is eventually digitized by a high linearity ADC.

The related art disclosed above does not provide a single channel detector circuit that may be utilized with a wide variety of detectors and improve the response of existing detectors. Those skilled in the art have long sought and will appreciate the present invention that addresses these and other problems.

SUMMARY OF THE INVENTION

An objective of the present invention is to provide improved radiation detector circuitry.

Another possible objective of the present invention is to provide an improved integrator circuit for receiving pulses from the radiation detector.

Yet another possible objective of the present invention is to provide an improved event detector utilizing a specialized hysteresis two-threshold method for producing event signals.

Yet another possible objective of the present invention is to provide a peak voltage detector with reduced drift noise by utilizing correlated double sampling for the detected peak value and the base reset value.

A possible advantage of the present invention may comprise utilizing sufficient bits in an analog to digital circuit for processing the detected peak voltage to provide a wide dynamic range over which the detected peak voltage can be usefully processed thereby eliminating electronic design adjustments for particular detectors and/or the ability to process high and low energy pulses in a single electronics channel.

Yet another possible objective of the present invention may comprise producing data collection processing signals locally without the need for a central computer.

Yet another possible objective of the present invention may comprise features of the circuitry which may be reprogrammed either remotely or locally.

Yet another possible objective of the present invention may comprise a radiation detector circuit that may be utilized with a variety of different radiation detectors.

Any listed objects, features, and advantages are not intended to limit the invention or claims in any conceivable manner but are intended merely to be informative of some of the objects, features, and advantages of the present invention. In fact, these and yet other objects, features, and advantages of the present invention will become apparent from the drawings, the descriptions given herein, and the appended claims.

Accordingly, in one embodiment the present invention provides a method for detecting charged particle radiation or uncharged radiation that impinge on a radiation detector. In a preferred embodiment, the radiation detector produces pulses of electrical charge. The radiation detector may operate at a high voltage, typically over 50 volts, or may not require a high voltage. The radiation may comprise charged particle radiation or uncharged radiation that impinge on a radiation detector. The electrical pulses may comprise an amount of electrical charge that corresponds to the total energy deposited in the radiation detector by the radiation. The method may comprise one or more steps such as, for instance, providing a circuit comprising a capacitance connected between a first node and the second node, connecting the circuit to the radiation detector such that the electrical charge produces a voltage across the capacitance, and connecting an amplifier input to the first node. Other steps may comprise configuring the amplifier to produce voltage pulses at an amplifier output representative of the electrical pulses wherein a peak voltage represents the energy in the radiation, and providing a current feedback loop from the amplifier output to the amplifier input such that the current feedback loop supplies a current error signal to the amplifier input.

The method may comprise other steps such as providing resistance between the first node and the second node such that the resistance is in parallel with the capacitance and such that a DC current error signal passes through the resistance to the amplifier input. The method steps may comprise selecting a magnitude of the resistance such that a discharge rate of the capacitance is much slower than an anticipated pulse width of the electrical pulses. The method may comprise providing an operational amplifier in series with the feedback loop from the amplifier output to the amplifier input.

In one embodiment, the method may comprise selecting the capacitance to produce a desired peak output voltage $V_o$ for a respective radiation event in terms of volts per energy such that:

$$Vo = \frac{E \cdot e \cdot 10^6}{Cf \cdot \varepsilon},$$

where

E is the energy of the incident radiation in Mega electron voltages (MeV), e is the charge of an electron ($1.6\times10^{-19}$ coulombs), the $10^6$ converts MeV to eV, $\epsilon$ is the detector's required energy, in eV, to produce an electron-hole pair (3.62 is a typical value for certain silicon solid state detectors employed at 300° K), and $C_f$ is the capacitance.

The method may also comprise applying the peak output voltage to a peak voltage detection circuit to produce an analog detected peak voltage, holding the analog detected peak voltage, and subsequently converting the analog detected peak voltage to a peak voltage digital value. In one embodiment, the method may comprise resetting the peak voltage detection circuit to an analog base value, converting the analog base value to a base value digital voltage, and determining a corrected peak voltage reading by calculating a difference between peak voltage digital value and the base value digital voltage. In one very specific embodiment, the method might possibly also comprise providing sufficient bits during the converting such that each bit represents less than 100 microvolts of the analog detected peak voltage depending, for instance, on the maximum voltage range of the corrected peak voltage. More generally, the method may also comprise providing sufficient bits during the converting such that a wide dynamic range is achieved alleviating the need for a high gain channel and a low gain channel to cover the span of possible radiation events.

The method may comprise steps such as utilizing the voltage pulses at the amplifier output for producing an event detection signal when a threshold voltage is reached, utilizing the event detection signal to start a timing routine which produces a start signal to start the converting of the analog detected peak voltage to the peak voltage digital value, and after the converting, then subsequently producing a reset signal to reset the peak voltage detection circuit to an analog base value. A data collection control, such as a state machine or other type of timing circuit may be utilized to produce a timing routine comprising timing signals applied to the appropriate circuits as required.

In one embodiment, the state machine or data collection control or other timing or logic circuit may produce signals to start the analog to digital converter to sample the analog detected peak voltage to produce a digital detected peak voltage, transfer the digital detected peak voltage value to the memory, create a time tag, and store the time tag along with the digital detected peak voltage in a memory, which may be a short term memory and/or a more permanent memory which may be accessed for analyzing the data.

The method may comprise counting a number of radiation events or event detection signals produced during a selected period of time and/or providing a clock for storing an associated time with the peak value digital value and/or providing memory for storing a plurality of the peak voltage digital values with a plurality of the associated time and for storing the number of the event detection signals produced during a period of time.

In one embodiment, the method may further comprise providing a bus for connection to a computer to transfer the stored plurality of the peak voltage digital values, associated time tags, and the number of the events detected during a period of time.

The method may comprise utilizing the voltage pulses at the amplifier output for producing an event detection signal when an analog value leading edge threshold voltage is reached, and subsequently preventing another event detection signal from being produced until an analog value trailing edge threshold voltage, which is lower than the leading edge threshold voltage, is reached. The method may comprise producing a digital value leading edge threshold voltage and converting the digital value leading edge threshold value to the analog value leading edge threshold value.

In one embodiment, the method may comprise reprogramming the analog value lead edge threshold value by producing a new digital value leading threshold voltage and transferring the new digital value threshold voltage through a standard bus connection to a logic circuit, which might be for example, a field programmable gate array. The method may further comprise providing a high voltage circuit to adjustably supply the voltage of from perhaps zero to over 500 volts or thousands of volts to the radiation detector, utilizing software in a computer to select a new high voltage for the radiation detector, and communicating through a standard bus to change to the new high voltage for the radiation detector.

The invention may further comprise a radiation processing circuit for processing pulses of electrical charge produced by a radiation detector and may utilize one or more components such as, for instance, a parallel circuit which may comprise a capacitance in parallel with a resistance. The parallel circuit may comprise a first end and second end with the first end being electrically connected to the radiation detector for receiving the electrical pulses and for producing a voltage across the capacitance. An amplifier input may be connected to the first end of the parallel circuit with the amplifier being configured to produce an output voltage at an amplifier output representative of the voltage across the capacitor. A feedback loop for the amplifier may connect the amplifier output to the amplifier input with the parallel circuit being connected in series with the feedback loop such that a current error feedback signal is directed from the second end of the parallel circuit to the first end of the parallel circuit and back to the amplifier input. Thus, in one embodiment, the feedback loop comprises a DC feedback loop through the resistance. The radiation processing circuit may further comprise an operational amplifier in series with the feedback loop from the amplifier output to the amplifier input such that the operational amplifier produces the current error signal for application to the second end of the parallel circuit.

The resistance parallel to the capacitance may comprise a magnitude such that the discharge rate of the capacitance is much slower than an anticipated pulse width of the electrical pulses. The parallel circuit may be in a configuration such that the voltage across the capacitance is proportional to the energy in the incident radiation for a respective of the electrical pulses. The amplifier may be configured to produce output voltage pulses at the amplifier output which are proportional in magnitude to the energy in the incident radiation for a respective of the electrical pulses.

The radiation processing circuit may further comprise a peak detect circuit operable to produce an analog detected peak voltage from the output voltage pulses at the amplifier output, the peak detect circuit may comprise an electronic switch responsive to a reset signal to reset the peak detect circuit to produce an analog base value, and an analog to digital converter operable to produce a digital detected peak voltage from the analog detected peak voltage. Other components may comprise a timing circuit operable to provide a start signal to start operation of the analog to digital converter to produce the digital detected peak voltage. The timing circuit may also be operable to subsequently produce the reset signal to reset the peak detect circuit to thereby produce the analog base value. The timing circuit may also be operable to initiate operation of the digital converter to produce a digital base value from the analog base value.

The event detector circuit may comprise a comparator and a leading edge threshold circuit where the leading edge threshold circuit is operable to convert a digital leading edge threshold value into an analog leading edge threshold voltage. The comparator is then operable for producing an event signal in response to the output voltage pulses at the amplifier output and the analog leading edge threshold voltage.

In one preferred embodiment, the comparator is configured such that a trailing edge threshold voltage must be triggered before the comparator produces a subsequent event signal.

In yet another possible embodiment, the radiation detector circuit may further comprise a computer and a standard bus in communication with the computer. The computer and the standard bus may be configured such that the computer is operable to reprogram the leading edge threshold circuit and provide a different digital leading edge threshold value for producing a different analog leading edge threshold voltage. The computer may also be able to transfer the digital detected peak voltage and the time value for the digital detected peak voltage from the memory to the computer through the standard bus.

In another embodiment, a radiation processing circuit comprises input circuitry for receiving the electrical pulses produced by the radiation detector and producing processed voltage pulses, a memory for storing a digital leading edge threshold value, and/or a digital to analog converter circuit operable to receive the digital leading edge threshold value and produce an analog leading edge threshold voltage. In one preferred embodiment, a comparator circuit is provided that is operable for producing an event signal in response to the processed voltage pulses and the analog leading edge threshold voltage. The comparator may be configured such that once the event signal is produced then an analog trailing edge threshold voltage must be triggered before the comparator resets so as to be operable to produce a subsequent event signal, the analog trailing edge threshold voltage being different than the analog leading edge threshold voltage. The comparator circuit may comprise a resistance connected to an output of the comparator with a magnitude and being configured to produce the trailing edge threshold voltage.

In one embodiment, the comparator may be configured for producing the event signal when the processed voltage pulses become equal to or greater than the analog leading edge threshold voltage. The leading edge threshold voltage may be required to be greater in absolute magnitude with respect to the trailing edge threshold voltage.

In one possible embodiment, the leading edge threshold voltage may be greater in absolute magnitude with respect to the trailing edge threshold voltage by an amount of from 4 millivolts to 200 millivolts, or by a percentage of the leading edge threshold voltage, or by a percentage of a fixed voltage.

The comparator circuit may comprise a capacitance configured to cause the analog trailing edge threshold voltage be different than the analog leading edge threshold voltage as a result of increasing slew rate.

A method for processing radiation detector pulses may comprise connecting the detector pulses to an event detector, configuring the event detector circuit such that when a leading edge of a respective of the detector pulses becomes greater in absolute magnitude than a leading edge threshold voltage, then the event detector produces an event output signal. Other steps may comprise preventing the event detector from producing a subsequent event output signal until a subsequent trailing edge of the respective of the detector pulses becomes less in absolute magnitude than a trailing edge threshold voltage. The leading edge threshold voltage may be greater in absolute magnitude than the trailing edge threshold voltage to prevent false signals caused by noise riding on the detector pulses.

The method may further comprise producing a digital leading edge threshold value, and converting the digital leading edge threshold value to the leading edge threshold voltage.

Other steps may comprise reprogramming the event detector circuit by producing a new digital leading edge threshold value and transferring the new digital leading edge threshold value through a standard bus connection to a logic circuit, which may or may not be a field programmable gate array, and then on to a digital to analog converter (DAC) which controls the threshold of the event detector comparator.

Another embodiment may provide a system comprising a plurality of radiation processing circuits for processing electrical pulses produced by a plurality of respective radiation detectors. The plurality of radiation processing circuits may comprise elements such as an event detector circuit for producing an event signal for each of the plurality of radiation processing circuits. Other elements may comprise a peak detect circuit to produce an analog detected peak value and an analog base reset voltage for each of the plurality of radiation processing circuits and an analog to digital converter. A memory for each of the plurality of radiation processing circuits may be utilized for storing collected data. Other elements may comprise at least one computer and/or a bus for interconnecting the memory to the computer for transfer of the collected data to the computer for each of the plurality of radiation processing circuits.

In another embodiment, the invention may comprise a radiation processing circuit operable for selective connection to any of a plurality of different radiation detectors. In this embodiment, components may comprise a high voltage power supply adjustable for each of the plurality of different radiation detectors, and a digital controller for the high voltage power supply for selectively controlling voltage applied to the power supply from zero volts to greater than 500 volts, e.g., 1000 or 3000 volts, in response to a digital high voltage control value. An input circuit may be utilized to produce voltage pulses in response to the electrical pulses from the radiation detector. An event detector with a comparator may be utilized to produce an event signal in response to the voltage pulses and an analog threshold voltage. A digital to analog converter may be utilized to produce the analog threshold voltage from a digital threshold value. A peak detect circuit may be utilized to produce an analog detected peak value and an analog base reset voltage. A control circuit may be utilized to control a data collection circuit upon receipt of the event signal and to store collected data. In one embodiment, the control circuit may interface with the digital controller for the high voltage power supply and the digital to analog converter. A bus interface may be utilized for connecting the control circuit to a computer whereby the high voltage and the analog threshold voltage may be selected for any of the plurality of different radiation detectors by providing the digital high voltage control value and the digital threshold value from the computer to the control circuit.

The radiation processing circuit may further comprise an analog to digital conversion circuit for each of the plurality of radiation processing circuits operable to convert the analog detected peak voltage and the analog base reset voltage to digital values. A corrected peak value may be produced by utilizing the digital values of the detected peak voltage and the base reset voltage, such as by correlated double sampling (CDS) wherein the base reset voltage may be subtracted from the detected peak voltage.

In yet another embodiment of the present invention for a system with a peak detector utilizing correlated double sampling, the radiation processing circuit may comprise an input circuit to produce voltage pulses in response to the electrical pulses. Other elements may comprise an event detector with a comparator operable to produce an event signal in response to the voltage pulses and an analog leading edge threshold voltage. Other elements may comprise a peak detect circuit operable to produce an analog detected peak value and an analog base reset voltage. An analog to digital conversion circuit may be utilized which is operable to convert the analog detected peak voltage and the analog base reset voltage to digital values, whereby a corrected peak value is produced by utilizing the digital values of the detected peak voltage and the base reset voltage. For instance, a corrected peak value may be produced by subtracting the base value from the detected peak value. A control circuit may be provided which is operable to control a data collection circuit upon receipt of the event signal In another embodiment of the invention, a radiation processing circuit is provided for processing high energy and low energy pulses produced by a radiation detector through a single channel. In one possible embodiment, the high energy and low energy pulses may comprise an energy in a range of from 0.008 MeV to 500 MeV. High and low energy pulses or channels are referred to here in terms of a useful range of absolute values. However, in accord with one possible preferred embodiment of the present invention, high and low energy pulses or channels may refer to the idea of an extended dynamic range that can cover a wide 'range' of pulse energy. In this sense, it is the range that extends from high to low energy channels rather than the absolute energy that can be detected and measured. In a presently described embodiment, the circuit is capable of over 90 dB of dynamic range, 65,536 different levels, whereby due to a high slew rate amplifier, corrected peak value, and high resolution A/D circuit, as explained herein it is possible to provide a circuit that can operate over such a dynamic range. Because of the wide dynamic range, the circuit of the present invention is in no way to any particular high and low pulse energy ranges, which may be largely due to the detector itself. For example, with a 90 dB dynamic range, the circuit could measure pulses from 500 MeV down to 0.015 MeV. The same circuit, by hooking up a different detector, could measure from 1 MeV down to 0.0000316 MeV, or 1,000,000 MeV down to 31.6 MeV. Related art circuits cannot do this and must be adjusted to detect and measure, using two separate electronic channels, any such wide range of high and low energy particles. Viewed in another way, the high and low energy pulses may be such that energy of at least some of the high energy pulses are a multiple of 100, 200, 500, 1000, 100,000 or the like as compared to at least some of said low energy pulses. The present invention detection and measurement of a larger range of pulses regardless of their absolute values, using the same detectors and when switching to different detectors.

The processing circuit may comprise an integrator circuit comprising an input amplifier with a slew rate greater than 1000 V/μsec and being configured to integrate each of the high energy and low energy pulses and produce a voltage pulse proportional to the energy of the high energy and low energy pulses. Other elements may comprise a comparator circuit for receiving the voltage pulse and making a comparison with a threshold voltage set to produce an event signal for both the high energy and low energy pulses. A peak detect circuit is operable to produce an analog detected peak value and an analog base reset voltage. An analog to digital conversion circuit is operable to convert the analog detected peak voltage to a digital detected peak value wherein the analog to digital conversion circuit utilizes sufficient bits in order to create a wide dynamic range. A control circuit may be utilized to initiate data collection of the analog detected peak value by activating the analog to digital conversion circuit in response to the event signal and resetting the peak detect circuit after the digital detected peak value is produced. A timer may be used to produce a time tag for association with each digital detected peak value produced by the analog to digital conversion circuit. A short term memory may be provided for temporarily storing the digital detected peak value and the time tag. An interface may be provided through which each digital detected peak value and the time tag are transferred to a computer memory, whereupon a plurality of digital detected peak values and a plurality of corresponding time tags are available for analysis at a subsequent time.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DESCRIPTION OF PREFERRED EMBODIMENTS

Figure 1:
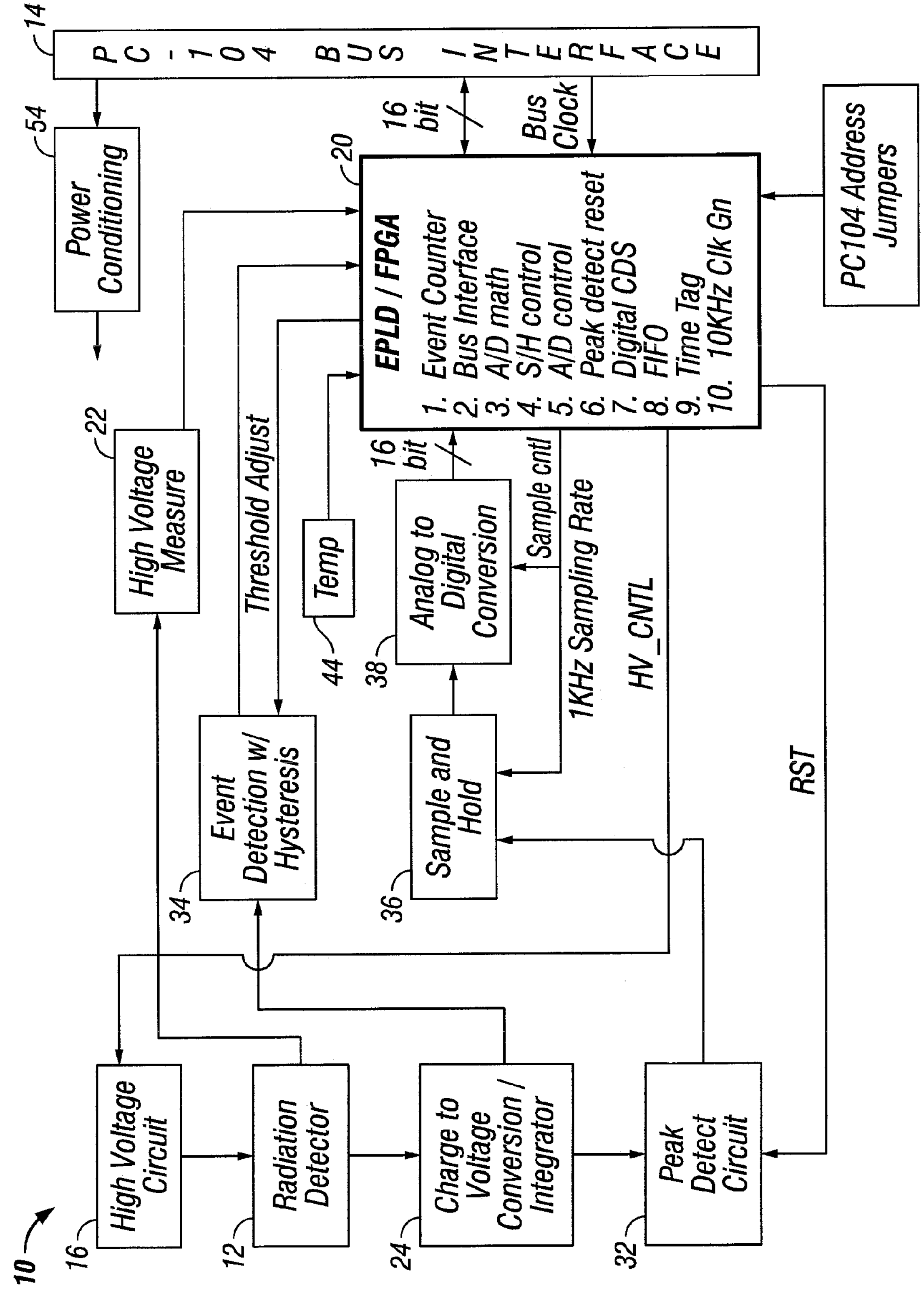
FIG. 1 is a block diagram for a radiation detection circuit in accord with one possible embodiment of the present invention.
Figure 11:
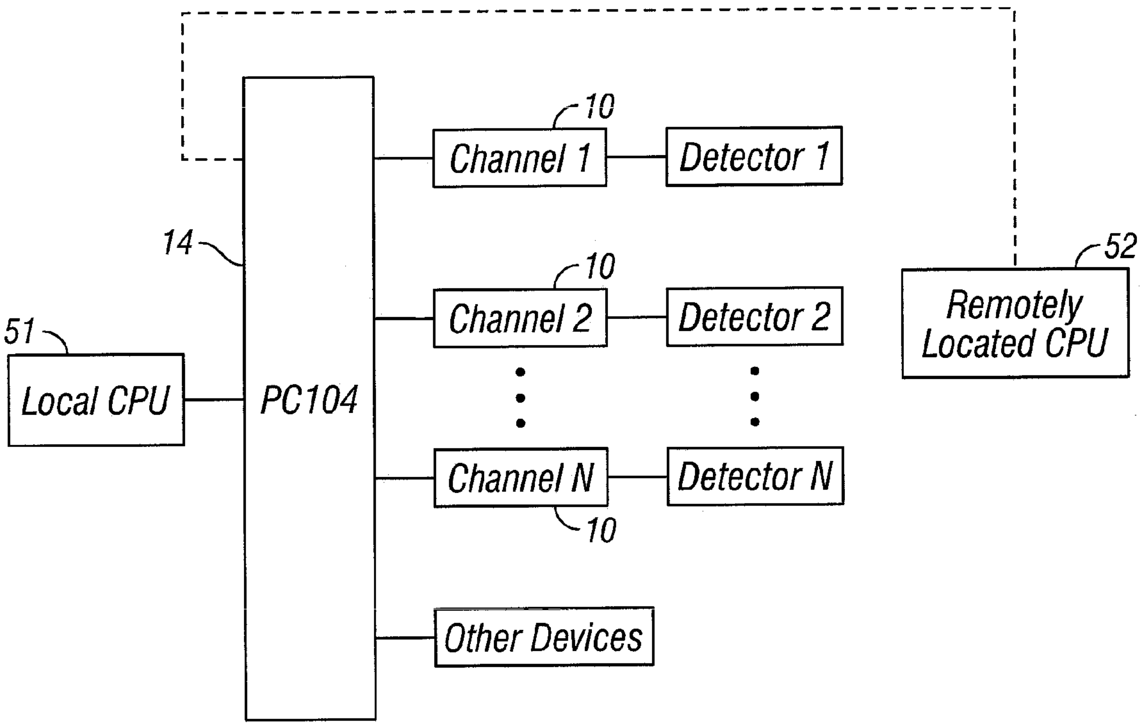
FIG. 11 is a block diagram showing multiple radiation detection circuits and other equipment interconnected in accord with one possible embodiment of the present invention.

Referring now to the drawings, and more particularly to FIG. 1, there is shown a block diagram for radiation detector circuit 10 in accord with one possible embodiment of the present invention. Radiation detector circuit 10 is programmable to operate with different radiation detectors and in a manner that is believed to improve operation of related art radiation circuits. Accordingly, radiation detector circuit 10 interfaces to radiation detector 12 and provides radiation events data to data bus 14 which may be a PC104 computer bus interface or other computer bus. Multiple radiation detector circuits 10 can be stacked together in a PC104, or other computer bus, bus stack to create a multiple detector system as indicated in FIG. 11.

Radiation detector circuit 10 may be programmed to operate with a wide range of different types of radiation detectors 12 by providing the high voltage and interfacing to detect the signal produced thereby. In one embodiment, the radiation detector may be of the semiconductor type. In this case, radiation detector 12 can be modeled as a diode. A reverse bias applied to radiation detector 12 by the high voltage 16 creates a depletion region within radiation detector 12. When charged particles enter the depletion region, free electrons are created, resulting in an electrical current flow. It will be noted that a guard ring (not shown) may be utilized if desired for connection to a solid state diode. For this purpose, a thin "guard" cathode (not shown) is used around the periphery of the signal cathode and gives it the same voltage as the signal anode. The guard collects the noisy surface currents. Since there is no voltage difference between the signal and guard anode, no noisy current flows between them and therefore the signal anode is freed from the surface noise.

In a preferred embodiment, radiation detector 12 is not integrated into the detection circuit 10 as per related art designs. Instead, radiation detector 12 circuit includes connectors (not shown) allowing connection of radiation detector 12, or other types of detectors to be used.

Figure 2:
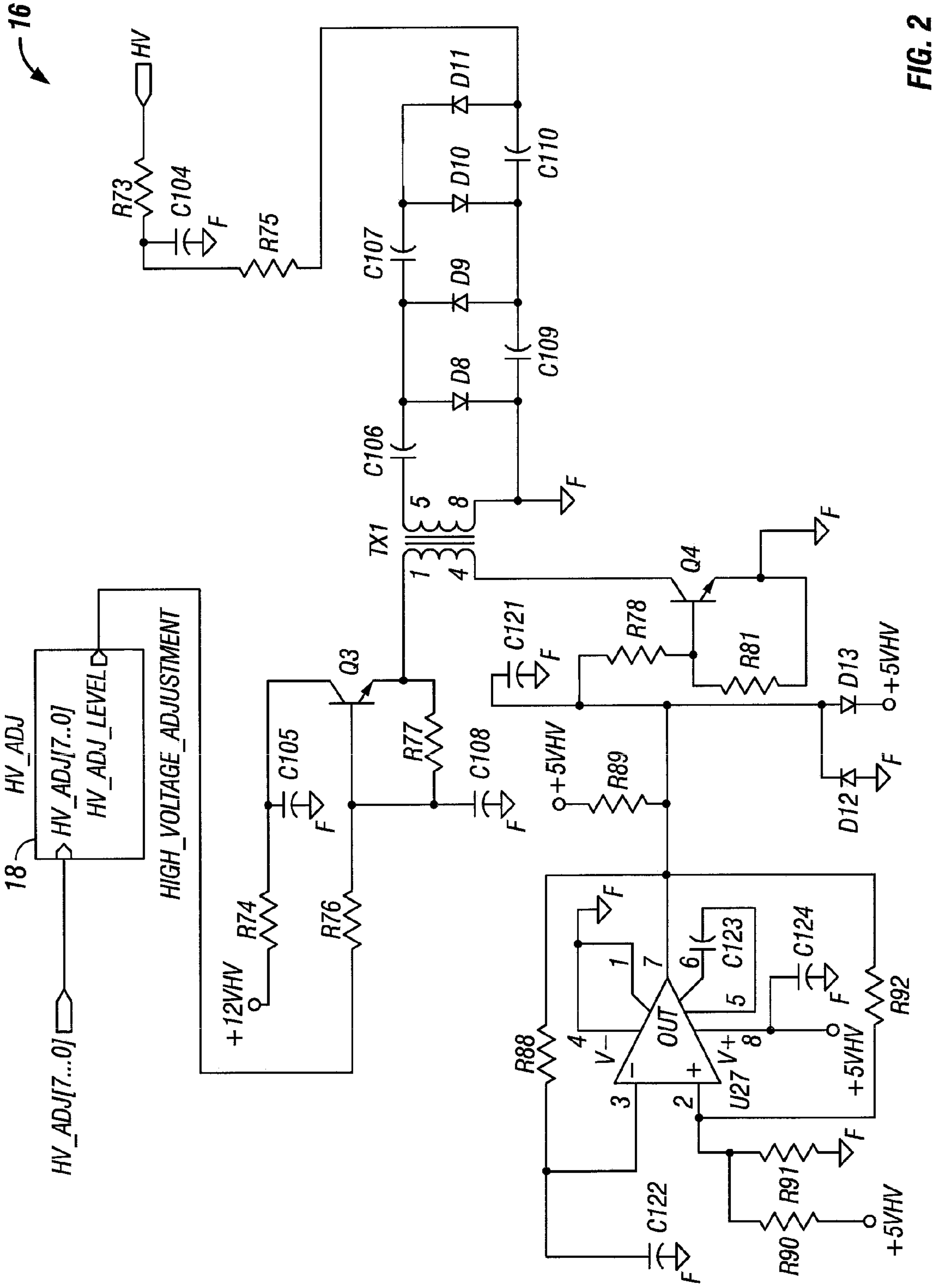
FIG. 2 is a circuit diagram for a computer adjustable high voltage detector supply in accord with one possible embodiment of the present invention.

Referring to FIG. 1 and to FIG. 2, there is shown computer controllable high voltage power supply 16. In one possible embodiment thereof, a non-limiting list of some of the possible purposes of the high voltage power supply 16 may comprise at least some and possibly all of the following functions:

a) create 0 to −1000V for detector biasing, b) create the required high voltage from the PC104, or other computer bus, bus power, c) employ voltage multiplication to create a high voltage, low current supply, d) allow high voltage adjustment by PC104, or other computer bus, computer, and/or e) interface to high voltage measurement circuit so that high voltage can be measured, monitored, and modified as needed.

Referring to FIG. 2, U27 creates an approximate 2 KHz oscillator. Its output is used to drive TX1 through Q4 and Q3. The amplitude of the signal within TX1 is determined by the controlling circuit, HV_ADJ which drives the base of Q3. The primary side of the circuit runs off +12V in order to be able to obtain the necessary high voltage output range. TX1 is a small, 25 mW, step up transformer which can transform input voltages to approximately 100 times their original voltage at switching frequencies between 50 Hz to 3 KHz. The diode and capacitor chain on the secondary side of the circuit then multiply this voltage by 2 for every stage of diodes and capacitors (e.g. C106, D8, C109, and D9 create one stage). R75, C104, and R73 create an output filter to suppress the noise created by this method of creating high voltages with large amplitude oscillations.

Figure 3:
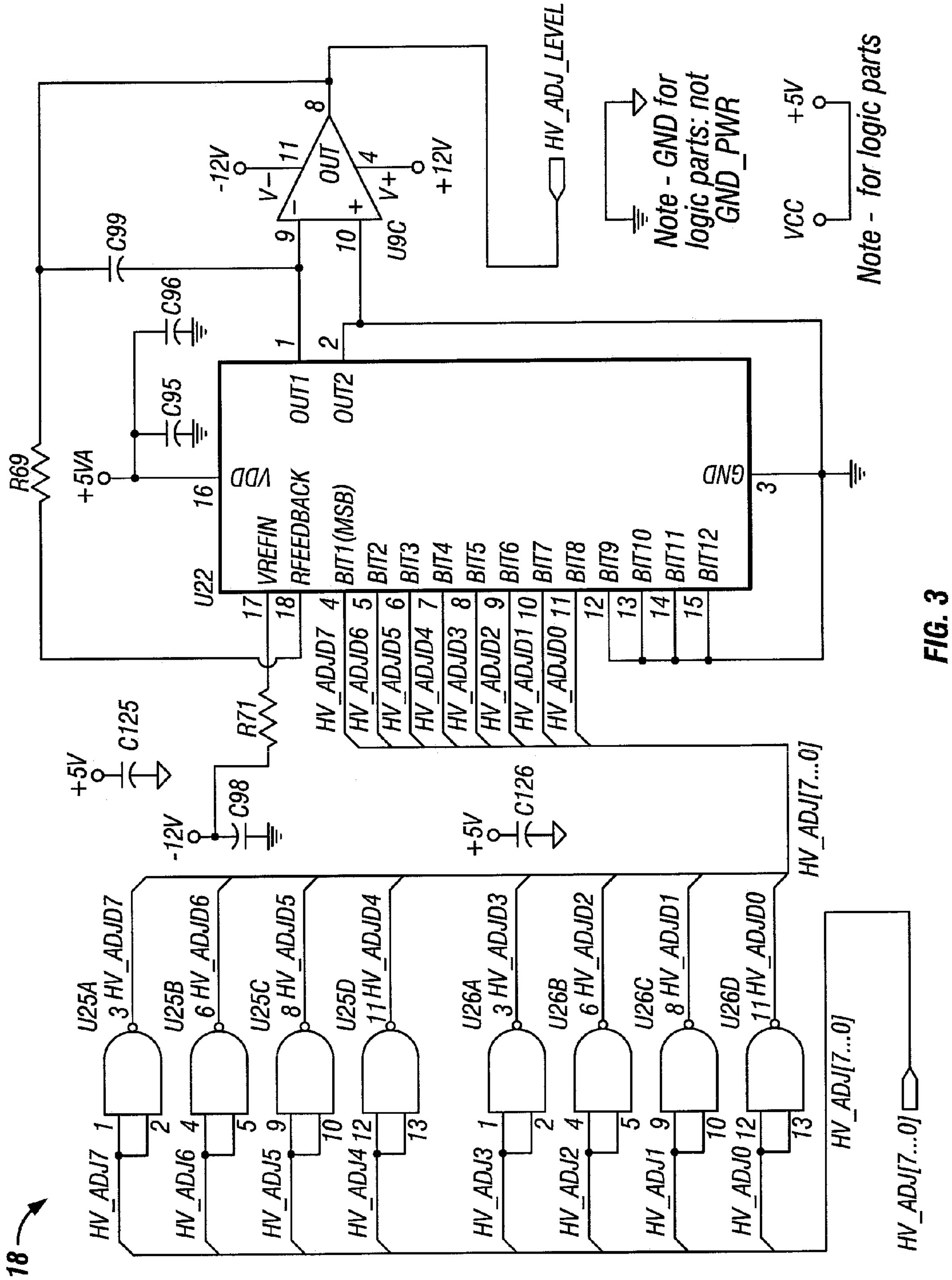
FIG. 3 is a circuit diagram for a high voltage adjustment circuit in accord with one possible embodiment of the present invention.

High voltage adjustment circuit 18 is shown in FIG. 2 and in more detail in FIG. 3. High voltage adjustment circuit 18 may be used to:

a) receive an 8 bit value from a logic circuit which might be (field programmable gate array) FPGA 20 or another type of logic circuit, which provides control over detection circuit 10, and may be used to adjust the high voltage level, b) convert the 8 bit value to a corresponding analog voltage between 0 and 12V, and c) buffer the output driving the high voltage circuit.

In this embodiment, NAND gates U25 and U26 are employed to invert the default value of the FPGA. When the FGPA is initially powered on, a high value is present on its pins. If not inverted, this would drive the high voltage circuit to its maximum level and potentially damage the detector. Referring to the FIG. 3, C98, and R71 create a negative voltage reference for the digital to analog (DAC) converter, U22. Note—The circuit uses the PC104, or other computer bus, bus +12V power. A more accurate/stable design could be realized using a stable +12V reference. The digital inputs HV_ADJ [7 . . . 0] are used to adjust the DAC to a level required to obtain the required high voltage. High voltage adjustment circuit 18 operates in conjunction with high voltage measuring circuit 22 (See FIG. 1) to adjust and verify that the proper high voltage is produced. The computer program measures the high voltage through the high voltage measuring circuit and then makes continuous adjustments to keep the high voltage at the correct level. This mechanism ensures that the proper voltage is always applied to any radiation detector 12 with which the radiation detection circuit 10 is used. It also allows for a computer program to ramp the high voltage up and down at an appropriate rate to prevent damage to radiation detector 12 during initialization or deactivation. R71 is selected as a trim resistor to set the following relationship when HV_ADJ [7 . . . 0] is 0xFF:

$$V_{OUT}=-V_{REF}(255/256)$$

A low bias current opamp is required due to the input of the OpAmp 'seeing' the DAC internal feedback resistance, nominally 11K Ohms. For example, the OP484, U9C has an 80 nA input bias resulting in only 880 μV input offset voltage. C99 provides phase compensation for stability when using high speed amplifiers. C99 is used to cancel the pole formed by the DAC internal feedback resistance (11K Ohms) and output capacitance at the output of U9C. U9C provides a buffered output to drive the high voltage circuit input.

Figure 4:
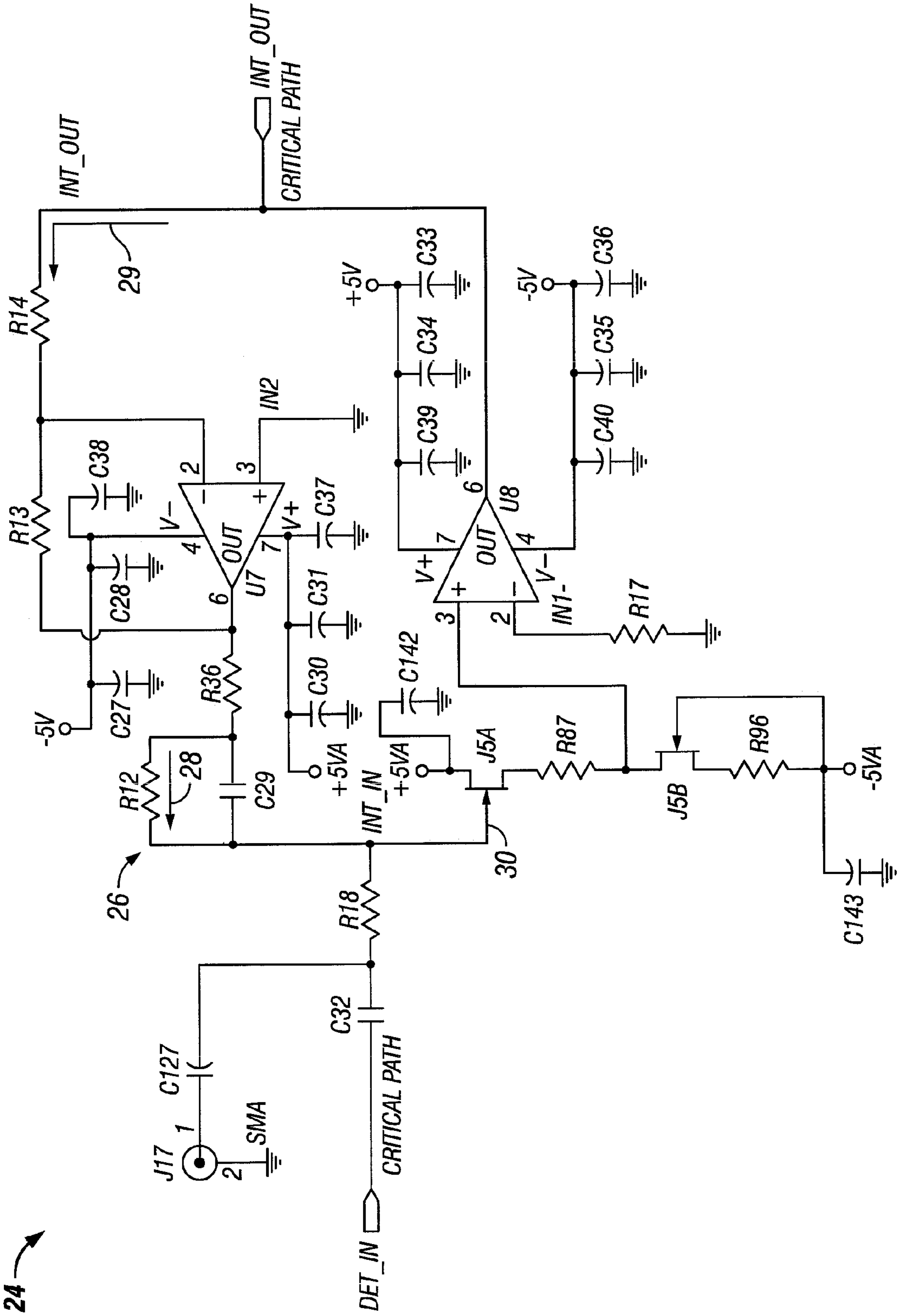
FIG. 4 is a circuit diagram for a charge to voltage conversion/integrator circuit in accord with one possible embodiment of the present invention.

Referring to FIG. 1 and FIG. 4, charge to voltage conversion/integrator 24 may preferably perform the following functions:

a) accept charge created by the particle entering radiation detector 12, b) transform the charge into a voltage, c) integrate the amount of charge to provide the 'area under the curve' or total amount of charge emitted by radiation detector 12, d) hold the resulting voltage long enough to be peak detected in the next circuit, e) buffer the output so that the input circuit can operate independently of the output interface, and f) discharge the capacitor to be ready for the next incoming pulse.

The output voltage (INT_OUT) is created by the incoming charge:

$$Vo = \frac{Q_D}{Cf}$$

where Vo is the output voltage, $Q_D$ is the charge on the capacitor (supplied by the detector), and $C_f$ is the size of the capacitor (C29).

In order to find the charge from the detector, flowing to the capacitor, $Q_D$ we use the following formula:

$$Q_D = \frac{E \cdot e \cdot 10^6}{\varepsilon}$$

E is the energy of the incident radiation in Mega electron voltages (MeV), e is the charge of an electron ($1.6\times10^{-19}$ coulombs), the $10^6$ converts MeV to eV, $\epsilon$ is the detector's required energy, in eV, to produce an electron-hole pair (3.62 is a typical value for many semiconductor detectors employed at 300° K).

Using the equations below, Vo can be determined by knowing the size of the capacitor and the incoming charge.

$$Vo = \frac{E \cdot e \cdot 10^6}{Cf \cdot \varepsilon}$$

The output voltage per incoming particle energy is of interest. This is:

$$\frac{Vo}{E} = \frac{e \cdot 10^6}{Cf \cdot \varepsilon}$$

If C29 were selected, for instance, to be 10 pF:

$$\frac{Vo}{E} = \frac{1.6 \cdot 10^{-19} \cdot 10^6}{10\text{ pF} \cdot 3.62} = \frac{4.4\text{ mV}}{\text{MeV}}$$

The upper range for this embodiment of integrator circuit 24 might possibly be designed to measure, as an example only, 500 MeV particles. For an example 500 MeV particle, the output of the integrator circuit 24 produces 2.2 volts.

Related art designs utilize voltage feedback. Voltage feedback, as the name implies, refers to a closed-loop configuration in which the error signal is in the form of a voltage. Voltage feedback is commonly used in op amp design. The op amp input then responds to voltage changes and produces a corresponding output voltage. Current feedback refers to any closed-loop configuration in which the error signal used for feedback is in the form of a current. A current feedback op amp responds to an error current at one of its input terminals, rather than an error voltage, and produces a corresponding output voltage.

The inventors submit that these related art designs would not allow accurate tracking of the incoming pulse, although the problem has apparently not been appreciated. By utilizing current feedback as indicated by arrow 29, the slew rate will be maximized for the capabilities of any particular op amp utilized. As a result of the present design, increased charge particle differentiation is available as compared to previous designs. The related art voltage feedback design results in a lack of discrimination capability between various charged particles and radiation sources.

In order to track a 2.2 volt pulse over 5 ns, a 440V/μs slew rate circuit is required. Assuming the worst case would be a pulse as short as 2 ns, 1100V/μs slew rate is required. A preferred high slew rate amplifier for this purpose results in selection of a current feedback amplifier rather than one with voltage feedback. An AD8001 OpAmp, which may be used in one preferred embodiment, supplies 1200V/μs slew rate.

J17 connector may be included to allow connection to a pulse generator for test purposes. J5A JFET increases the input impedance and serves to isolate the input bias/leakage current of U8 from the charge storing capacitor C29 (10 μF.) J5B is configured as a constant current source which results in directing all the incoming signal current into the non-inverting input of U8. Because a current feedback amplifier is used, C29 cannot be put directly in the feedback path. Instead, U7 is required as a buffer to isolate the capacitor, C29, from U8's feedback path. R36 (107 ohms) may be utilized for circuit stability (damping). The output of the circuit idles at a DC voltage of about 0.35V (from tests).

R12 (1 MEG) plays two roles, providing a DC feedback loop for the circuit and discharging C29 with a time constant of 10 μs. The time constant is much greater than the anticipated width of the detector pulses to be detected as discussed above. Accordingly, due to current feedback, parallel circuit 26, comprising C29 in parallel with R12, is in series with the current feedback path. DC current flows through R12 as indicated by arrow 28, whereupon the current feedback is applied to amplifier input 30.

Figure 5:
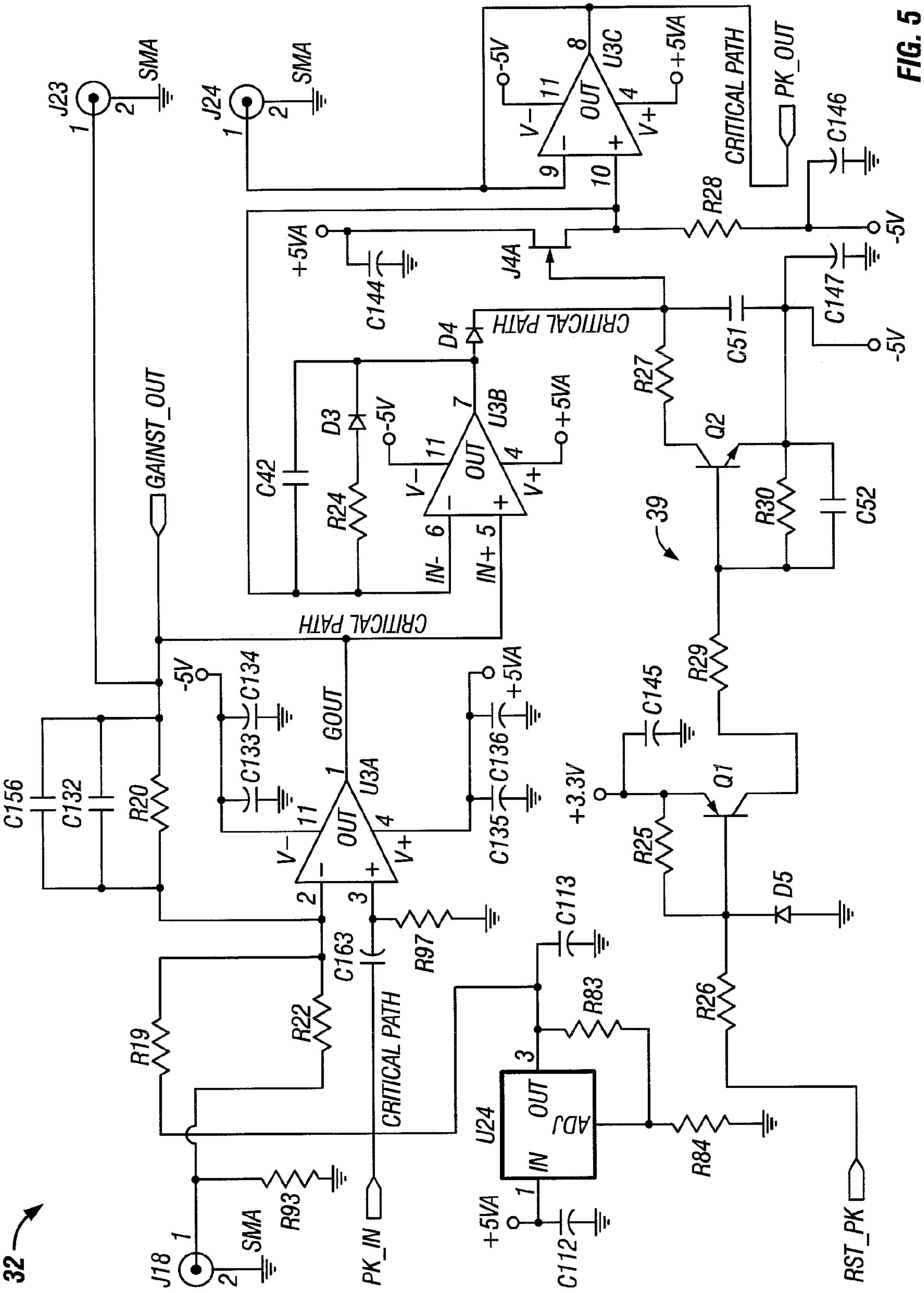
FIG. 5 is a circuit diagram for a peak detect circuit in accord with one possible embodiment of the present invention.

Referring now to FIG. 1 and FIG. 5 there is shown peak detect circuit 32. Preferred embodiment purposes of the peak detect circuit 32 may include:

a) receive the incoming pulse from integrator 24, b) provide DC offset and gain to meet the analog to digital converter's −2.5 to +2.5V input range, c) detect and hold the peak of the incoming pulse long enough for sample and hold circuit 36 to acquire the signal, d) increase the time scale of the signal from the 200 ns range to the 200 μs range, and/or e) reset the peak held signal via control from FPGA 20 logic.

J18 may be used to allow the injection of a signal to emulate integrator 24 output for testing. J23 is the test point for the gain stage output (U3A) and J24 is the test point for the peak detector output (U3C). J18 can be used to install sensors with a remote preamp. U24 provides a constant DC offset to the output of the gain stage regardless of PC104, or other computer bus, bus power fluctuations. The signal from the previous stage is AC coupled via C163 so that its DC variations do not affect this stage. In the present design, U3A, the gain stage, amplifies the signal by 2.27 resulting in a 5V signal created from a 500 MeV event at U3A's output. C132 (10 pF) may be included for stability, creating a lowpass filter with a −6 dB point at 1.6 MHz.

The output of the gain stage (U3A) is also passed to event detection circuit 34 via GAINST_OUT. This configuration allows the non-peak detected signal to be used to trigger the event detection process indicating that an event has occurred. This method is desired to implement hysteresis by detecting the rising and falling slopes of the gain stage output as discussed hereinafter in the description of event detection circuit 34. A node analysis of the gain stage, U3A, provides the relationship of its output, pin 1 of U3A, versus its input, pin 3 of U3A:

$$\frac{Vo - Vi}{R20} = i_2$$

Vo is the output voltage, pin 1 of U3A, Vi is the input voltage, pin 2 and pin 3 of U3A (pin 2 and 3 are equal due to the negative feed back through R20). R20 (10K) is the feedback resistor, and $i_2$ is the current through R20.

$$\frac{Vi - 2.5}{R19} = i_3$$

R19 (10K) connects the circuit to the 2.5V bias supply in order to make the range −2.5 to +2.5 for the analog to digital converter. The current through R19 is $i_3$.

$$\frac{Vi}{R22} = i_3$$

R22 (31.6K) is the incoming signal gain setting resistor. The current through R22 is $i_3$.

$$i_1 + i_3 = i_2$$

All the currents entering and leaving the node, Vi (pin 2 of U3A) must equal.

$$\frac{Vo - Vi}{R20} = \frac{Vi}{R22} + \frac{Vi - 2.5}{R19}$$

$$\frac{Vo}{R20} = \frac{Vi}{R20} + \frac{Vi}{R22} + \frac{Vi}{R19} - \frac{2.5}{R19}$$

$$Vo = Vi\left(\frac{R20}{R20} + \frac{R20}{R22} + \frac{R20}{R19}\right) = \frac{2.5 \cdot R20}{R19}$$

$$Vo = Vi\left(1 + \frac{R20}{R22} + \frac{R20}{R19}\right) = \frac{2.5 \cdot R20}{R19}$$

Peak detect circuit 32 in the present embodiment may be based on the OP-467 OpAmp. This is a voltage feedback amplifier with a slew rate of 170V/μs. While the high slew rate of integrator 24 provides an improved response as compared to related art designs, a slower slew rate is acceptable here due to the time stretching of the signal by integrator circuit 24. In order to rise to the needed 2.2 volt input within 100 ns, only a 22V/μs slew rate is required.

The output of the gain stage, U3A is passed to the input of U3B, the peak detection circuit. U3B forms a 'superdiode' configuration with D4 and J4A. This configuration overcomes the voltage drop (approx. 0.6V) normally associated with a forward conducting diode. Current is flowed through D4 whenever the signal on pin 5 (non-inverting input) of U3B exceeds that of pin 6 (inverting input) of U3B. The resulting charge is stored on the capacitor C51 (1500 pF) to create the peak incoming voltage. J4A functions to increase the impedance seen by C51 and decreasing its discharge rate. D3 serves to maintain U3B's stability in the case of reverse voltages appearing on pin 7 of U3B. In this case, the loop is closed employing D3 and R24 rather than allowing U3B to become an open loop, large gain circuit. C42 (150 pF) is included for stability and low pass filtering.

Peak detect discharge circuit 39 is made up of Q1, Q2 and supporting circuitry. Peak detect discharge circuit 39 receives a negative going pulse from FPGA 20 turning Q1 on. Q1 then supplied a positive voltage to Q2 turning it on as well and discharging C51 (1500 pF) through R27 (10 k) to produce a base reset value output from U3C. R30 (10.2 k) and C52 (10 pF) facilitate turning Q2 off, and R25 (102 k) performs a similar function for Q1. D5 clamps the incoming voltage to ensure that it does not go appreciably negative (mostly needed for testing with a function generator). R49 (51.1) is a matching resistor for use with a function generator and should not be populated in the flight design. Peak detect discharge circuit, as indicated at 39 in FIG. 5, receives signals from a +3.3V FPGA thus requiring Q1 to employ +3.3V. Not doing so would supply +5V to FPGA 20 outputs in some situations. U3C is a voltage follower used to buffer the resulting peak detected signal whereby peak detect circuit 32 produces a detected peak voltage and base reset voltage.

Figure 6:
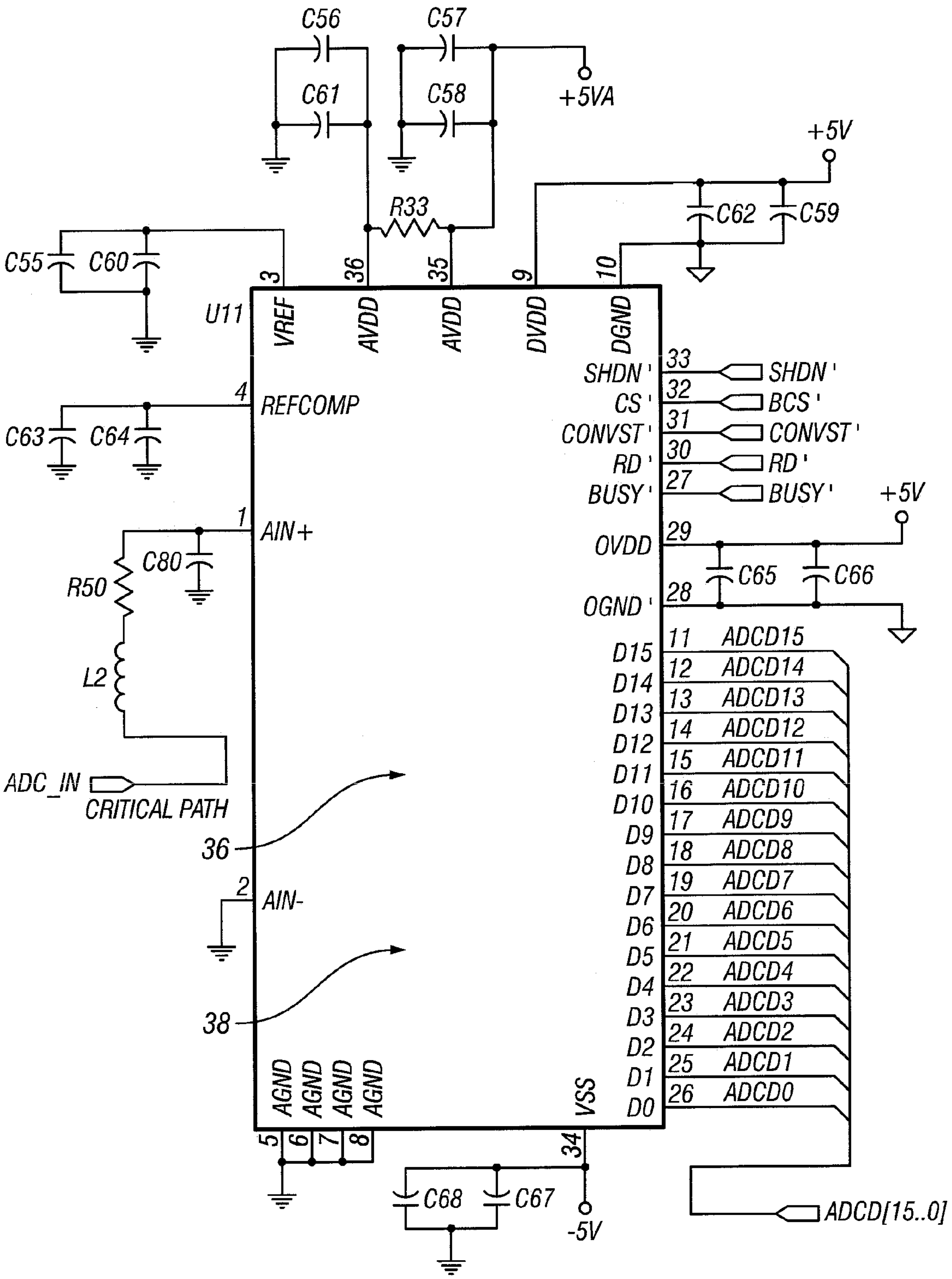
FIG. 6 is a circuit diagram for a sample and hold plus analog to digital conversion in accord with one possible embodiment of the present invention.

Referring to FIG. 1 and FIG. 6, there is shown the combined sample and hold (S/H) circuit 36 and analog to digital converter circuit (ADC) 38, both of which may be implemented in integrated circuit U11 in FIG. 5.

Sample and hold circuit 36 may be utilized as follows:

a) take a sample of the signal produced by peak detection circuit 32, b) hold the sample long enough for the analog to digital converter circuit (ADC) 38 to create a quantized number representing the voltage level on S/H 36, c) sample both the detector output signal and the reset value for the purpose of performing correlated double sampling, and d) suppress droop characteristics over the time required for ADC 38 to produce its results. Droop error is kept low in the present design. Droop error is the error due to discharge of capacitor 51 which occurs during periods of long peak-hold duration.

Previous designs did not appreciate the advantages of using correlated double sampling (CDS) as described herein. The inventors submit that an advantage of CDS is that it subtracts correlated noise between the reset sample and the data sample. This decreases low frequency noise such as drift. Only the signal created by the radiation event are measured rather than any spurious offsets.

A non-limiting list of purposes of analog to digital conversion (ADC) circuit 38 may or may not comprise one or more or all of the following:

a) produce a numerical representation of the signal being measured, b) interface to the FPGA for control signals, and/or c) provide the separation point between the analog circuits and digital circuits.

In the circuitry of combined sample and hold (S/H) circuit 36 and analog to digital converter circuit 38, there are two distinct power systems being employed. These are analog power and ground and digital power and ground. Analog power is shown as +5VA and analog ground is shown as the three line ground symbol such as on C63. Digital power is shown as +5V and digital ground is represented as the triangle ground symbol like is used on C62. The bypass caps on the various power interfaces employ both a large tantalum capacitor and a smaller ceramic capacitor. This arrangement is being used to allow the bypassing scheme to cover a larger range of noise frequency than could be covered by a single capacitor.

The input filter made up of L2, R50, and C80 are in place to suppress noise spike that emanate from the input of ADC 38 which are caused by the internal signal switching of ADC 38 and S/H 36. ADC 38 is being operated in a single ended mode by grounding the Ain—input, pin 2 of U11.

The control pins interfacing to FPGA 20 provide the following functions:

SHDN'—Power shutdown. When driven low with CS' low ADC enters 'nap mode' [7.5 mW]. When driven low with CS' high, enters sleep mode [5 mW]. This design employs nap mode and not sleep mode. Note—normal operation during active is 220 mW. Note—nap mode requires a 200 ns wake-up time, sleep mode requires a 160 ms wake-up time.

CS'—Must be low for the ADC to recognize CONVST' and RD'.

CONVST'—Conversion start. Conversion starts on its falling edge when CS' is low.

RD'—Read input. Logic low enables the output drivers when CS' is low.

BUSY'—Provides the converter status to the FPGA. It is low when a conversion is in progress. Data is valid on the rising edge of BUSY'.

ADC 38 can run up to 333 ksps (kilo samples per second), but is only being used at 1 ksps in a preferred embodiment of this application. ADC 38 may be a 16 bit successive approximation algorithm ADC. In this case, each least significant bit represents 76.3 μV. By itself it has a signal to noise ratio of 90 dB and 100 dB total harmonic distortion. It has no missing codes, and no pipeline delay. The internal reference (15 ppm/° C.) is used rather than employing an external one. The internal clock runs asynchronous to the FGPA. The full-scale input range is −2.5V to +2.5V. The present design eliminates the need for two separate channels one of which is at high gain for smaller signals. The two separate channel process has been used perhaps for decades and those of skill have not appreciated that it is unnecessary. The present design eliminates the two channel design as used in the related art, and which must normally be specially tuned to a particular detector and biasing arrangement, and instead provides increased dynamic range which translates into the ability to detect both high energy and low energy events with the same configuration, and for improved use with different detectors.

High and low energy pulses or channels may be referred to here in terms of a useful range of absolute values. However, in accord with one possible preferred embodiment of the present invention, high and low energy pulses or channels may refer to the idea of an extended dynamic range that can cover a wide 'range' of pulse energy. In this sense, it is the range that extends from high to low energy channels rather than the absolute energy that can be detected and measured. In a presently described embodiment, the circuit is capable of over 90 dB of dynamic range, 65,536 different levels, whereby due to a high slew rate amplifier, corrected peak value, and high resolution A/D circuit, as explained herein it is possible to provide a circuit that can operate over such a dynamic range. The peak voltage of at least some high energy pulses as compared to at least some low energy pulses may differ by a multiple of from approximately 100 to 100,000 or more and the processing circuit of the present invention will be able to record accurate values which may be analyzed at a later time. The related art circuitry is simply unable to do this and therefore requires special channels for relatively high and low energy pulses.

For instance, peak detect circuit 32 is operable to produce a range of output which might be called a maximum voltage range, or maximum dynamic voltage range, or maximum range. If the maximum dynamic voltage range is 5 volts for said analog detected peak voltage, then analog to digital conversion circuit 38 utilizes sufficient bits such that digital values produced thereby have a resolution of the maximum range of said analog detected peak voltage, or 5 volts, divided by at least 60,000, or in this case by 65,536. The actual number of bits may be varied appreciably but it will be appreciated that only if the analog detected peak voltage is of suitable quality as taught by the techniques herein, that the high resolution will be useful. However, with a good quality or accurate and low noise analog detected peak voltage, then the resolution provided eliminates the need for separate electronic channels.

Because of the wide dynamic range, the circuit of the present invention is in no way to any particular high and low pulse energy ranges, which are largely due to the detector itself. For example, with a 90 dB dynamic range, the circuit could measure pulses from 500 MeV down to 0.015 MeV. The same circuit, by hooking up a different detector, could measure from 1 MeV down to 0.0000316 MeV, or 1,000,000 MeV down to 31.6 MeV. High and low energy pulse energy ranges may also be specified as a multiple of each other. For instance, the high energy pulses may comprise a detected peak value greater than one hundred or greater than two hundred or greater than five hundred times an anticipated detected peak value of the low energy pulses. Related art circuits cannot do this and must be adjusted to detect and measure, using two separate electronic channels, any such wide range of high and low energy particles. The present invention detection and measurement of a larger range of pulses regardless of their absolute values, using the same detectors and when switching to different detectors. For instance, high and low energy particles result in production of what may be referred to as high energy pulses and low energy pulses, and where at least some of the high energy pulses and low energy pulses may differ from each other by a factor of 100, 200, 500, 10,000, 100,000 or greater.

Figure 8:
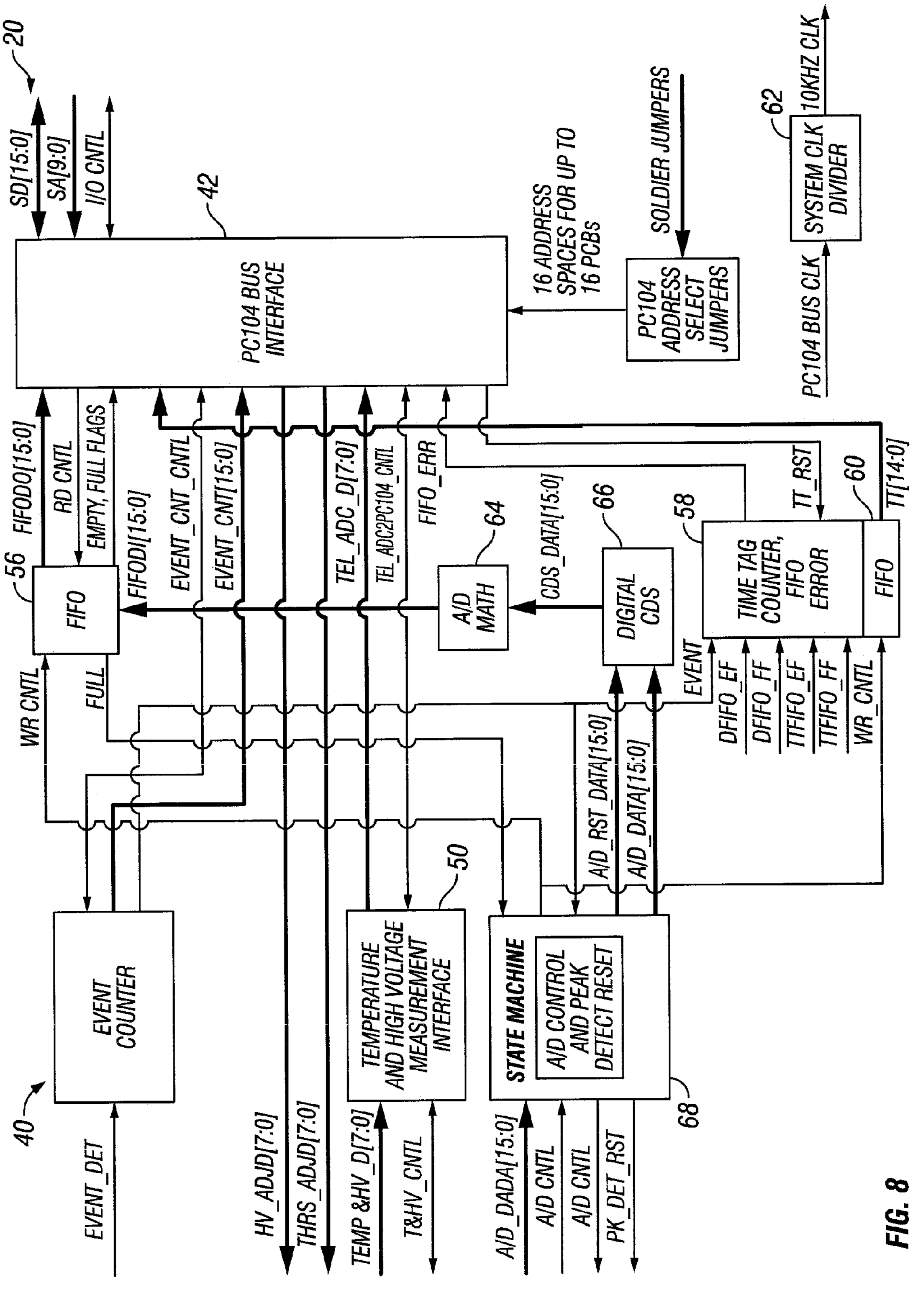
FIG. 8 is a block diagram for a logic circuit to provide local control of the detection circuitry in accord with one possible embodiment of the present invention.

S/H 36, ADC 38, and peak detection reset may be hardware controlled by a suitable state machine implemented in FPGA 20, such as state machine 68 shown in FIG. 8. Thus, state machine(s) 68 acts a data collection control. Other types of logic or logic circuitry may also be utilized. In this example, the state machine may operate on a 10 KHz clock (0.1 ms). The state machine can complete its cycle in 10 clock cycles or 1 ms resulting in the 1 KHz radiation event sampling rate.

Figure 7:
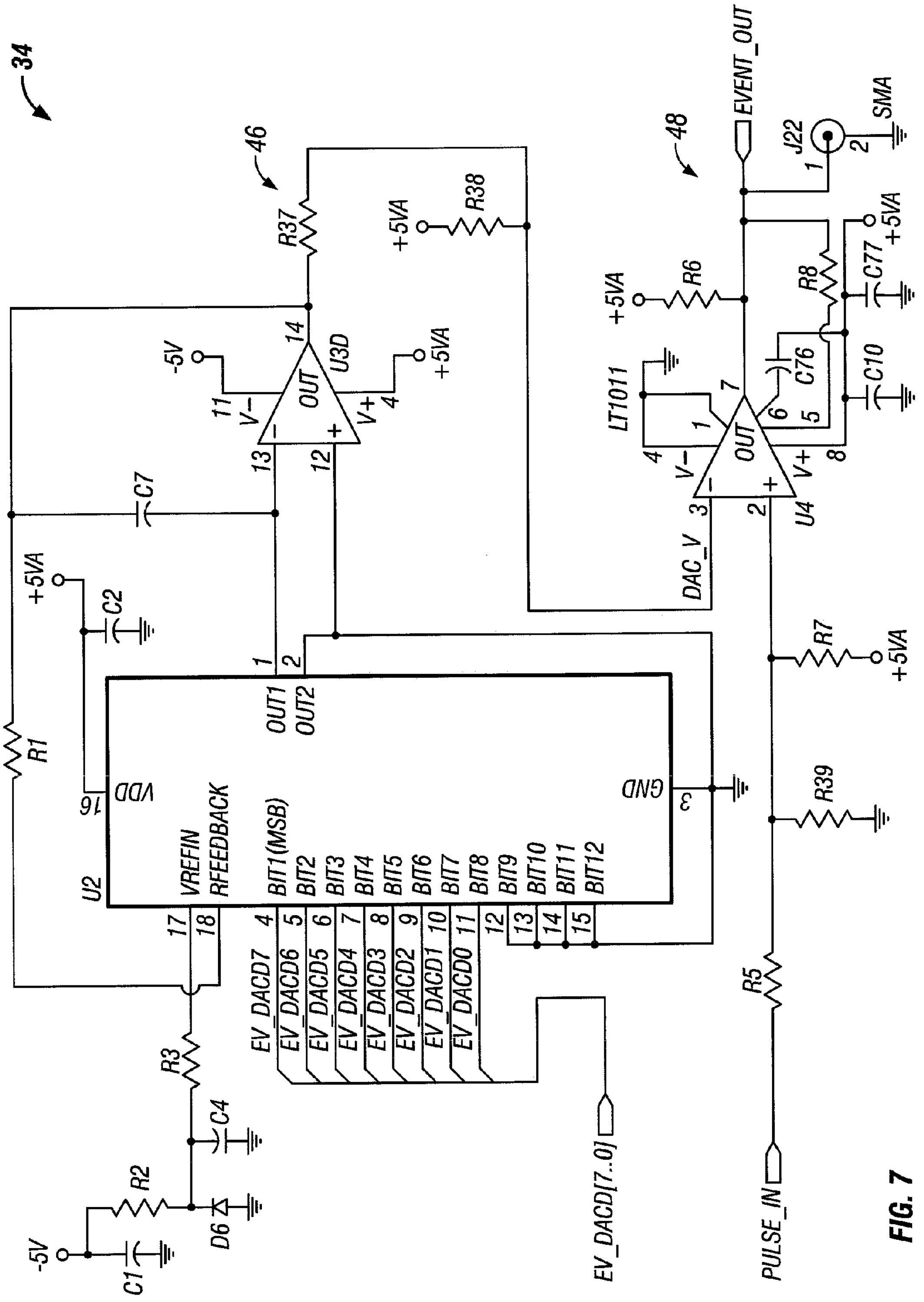
FIG. 7 is a circuit diagram which provides event detection utilizing hysteresis in accord with one possible embodiment of the present invention.

Referring to FIG. 1 and FIG. 7 there is shown event detection w/hysteresis circuit 34. A threshold adjust circuit 46 may be computer controlled and is used to apply a threshold voltage to comparator circuitry 48 which utilizes comparator U4 to determine when an event is detected. As non-limiting examples, event detection circuit 34 may be used to perform some or all of the following functions:

a) receive an 8 bit number via threshold adjust 46 from FPGA 20 for setting the detection threshold. The detection threshold by be changed as desired for changing radiation detectors 12, or for detecting different types of radiation pulses with the same radiation detector 12, or for other reasons b) allow the setting of the threshold of 0 to 25% of maximum circuit dynamic range (500 MeV), c) select events detected via the threshold level, d) employ hysteresis to suppress false triggering on noisy rising edges of detector pulse, e) supply event pulse FPGA 20 for two purposes: start of data gathering process for event, and counting of number of events occurring per minute, and f) triggers the storing of time tags with each measured and stored radiation event.

In one embodiment, event detector circuit 34 can measure up to 1000 events per second, but event counter is asynchronous to system clock and can count more than 1000 events per second. In one embodiment, a 15 bit time tag counter may be used which has a 0.1 ms period, wrapping around in 3.2768 seconds.

One of the problems with related art designs is sensitivity to noisy detector pulse signals. In many cases, noise will be present on these signals. This resulted in spurious false triggers during the rising edge of the pulse being detected. Related art designs designed for particular detectors may use specialized biasing circuits to attempt to overcome these problems. The present invention provides hysteresis techniques for this purpose as discussed below that are so effective that the present design can be utilized with different radiation detectors.

Employing hysteresis as discussed herein ensures that only one pulse is produced per each rising edge, and only one pulse produced per radiation event. In one preferred embodiment, effectively two different triggers are utilized, namely a leading edge trigger for the leading edge of the detector pulse and a trailing edge trigger for the trailing edge of the detector pulse. In other words, there is what may be referred to as a leading edge threshold voltage or value and a trailing edge threshold voltage or value that are utilized to effect the hysteresis process. The trailing edge trigger, or leading edge threshold voltage or value, may be preferably less in magnitude than the leading edge trigger by an amount of noise in the signal and in this embodiment is set for a desired amount by R8 as discussed below. As an example of operation, for a positive pulse, if the leading edge trigger is set to a one volt signal, then the trailing edge trigger, or trailing edge threshold voltage or value, might be set at some desired number of millivolts, e.g., 20-70 millivolts below this level with R8. In this way, a leading edge with 10 millivolts of noise riding on the signal would not oscillate around the one volt trigger level as the leading edge approaches the one volt level, and thereby indicate more events than actually occurred. Instead, once the event is triggered, then the input signal level will have to drop back to the trailing edge trigger before the circuit will produce another event output signal. It will be noted that the same principle may be used for a negative going pulse whereby the absolute magnitude of the leading edge trigger voltage will still be greater than that of the trailing edge trigger voltage, e.g. a leading edge trigger for a negative pulse may be −1 volt and a trailing edge trigger might be −0.97 volts.

Referring to the FIG. 7, C1 (0.1 μF), R2 (5.23 k), D6 (D1N4150) and C4 (1 μF) create a negative voltage reference for the digital to analog (DAC) converter, U2. The digital inputs EV_DACD [7 . . . 0] provides a leading edge threshold digital value from FPGA 20 which is converted by U2 to an analog leading threshold voltage at pins 1 and 2. The digital inputs EV_DACD [7 . . . 0] are used to adjust the DAC to a level representing approximately 0 to 25% of the circuit's full scale, 5V ADC input or 500 MeV radiation event. R3 is selected as a trim resistor to set the following relationship when EV_DAC [7 . . . 0] is 0xFFFF:

$$V_{OUT}=-V_{REF}(255/256)$$

A low bias current opamp is required due to the input of the opamp 'seeing' the DAC internal feedback resistance, nominally 11K Ohms. The OP467, U3D has a 10 nA input bias resulting in only 110V input offset voltage. C7 (33 pF) provides phase compensation for stability when using high speed amplifiers. C7 is used to cancel the pole formed by the DAC internal feedback resistance (11K Ohms) and output capacitance at the output of U3D.

Resistors R37 (51.1K), and R38 (200K) take the 0 to approx. 0.5V input from the DAC and translates it into 1 to 1.375V for comparison with the incoming signal pulse. The comparison is implemented by the comparator U4. R5 (184K), R7 (150K), and R39 (150K) are used to translate the incoming −2.5V to +2.5V signal into 1 to 2.5V. The incoming signal, PULSE_IN is connected to the gain stage output GAINST_OUT. The 1 to 1.375V signal on the inverting input of U4 represents 0 to 25% of the 1 to 2.5V signal on the non-inverting input of U4, allowing pulse detection threshold over the lower 25% of the detected signal.

R8 (10M) provides DC hysteresis, and C76 (0.0047 μF) provides AC hysteresis. In a preferred embodiment, the combination of AC and DC hysteresis creates clean oscillation-free switching. The use of hysteresis consists of shifting the input offset voltage of the comparator when the output changes state. Hysteresis forces the comparator to move quickly through its linear region, eliminating oscillations by overdriving the comparator under all input conditions. Hysteresis may be AC or DC. AC techniques do not shift the apparent offset voltage of the comparator, but require a minimum input signal slew rate to be effective.

DC hysteresis works for all input slew rates, but creates a shift in offset voltage dependent on the previous conditions of the input signal. R8 may be set for any desired trailing edge trigger, may be variable, and could be a computer controlled value, if desired, as is the value for the leading edge trigger.

One advantage of the LT1011 hysteresis configuration, as used in the example circuit, is that it does not force any signals back onto the input signal source (potentially changing the input signal). Instead, it takes advantage of the balance input pins (pins 5 and 6) to provide fast, clean output switching from low to high frequencies. Although use of a comparator, by utilizing a feedback resistor to connect the output to a non-inverting input, a leading edge threshold and trailing edge threshold requirement for the comparator could be effected. AC hysteresis is formed by C76 bypassing one of the balance inputs, pin 6 to +5VA. When the output changes, the balance pins shift slightly. If one is bypassed, pin 6, AC hysteresis is created. The result of AC hysteresis is that a larger input offset voltage is required to make the comparator's output switch at higher frequencies than at lower frequencies. This helps decrease false triggers due to noise.

R6 is the pull-up for the open collector output of U4, and J22 is a test point to view the event detection comparator output.

Referring to FIG. 1, FIG. 7 and FIG. 8, output from pin 7 of comparator U4 is applied to event counter 40 in FPGA 20 (See FIG. 8). Event counter 40 in FPGA may preferably be a 16 bit counter that counts each rising edge. "Event counter 40 is asynchronous to the other system clocks (10 KHz clock and computer bus clock). Comparator U4 threshold level is set between 0 and approximately 25% of full scale by the 8 bit EVENT_THRESHOLD/THRS_ADJD [7 . . . 0] supplied by the PC104 bus interface 42. Once per minute, the Event Counter value is transferred to the EVENT_CNT [15:0] bus interface 42 area in FPGA 20 and the OK_RD_EVENT_CNT bit is set. A free running Minute Counter uses the 10 KHz clock counting from 0 to 599,999 to equal one minute. The transfer of Event Counter to EVENT_CNT [15:0] occurs on the rising edge of the 10 KHz clock at count 599,999 of the Minute Counter. In addition, on the same rising edge, the minute counter is reset to 0. During the 10 KHz clock cycle after count 599,999, the Event Counter is reset and starts counting events for the next minute after one clock cycle (100 μs) has passed. The Event Counter counts events at all time except for the 100 μs when it is being reset. The Event Counter is reset on the next count after count 599,999 of the minute counter (count 0). When the EVENT_CNT [15:0] is read, the OK_RD_EVENT_CNT bit is reset. Writing a '1' to RST_EVENT_CNT resets both the minute counter and the Event Counter. Event counter bus interface signals:

EVENT_CNT [15:0]—Reads the number of events that have occurred within the last minute cycle. It is implemented as a wrap around counter not stopping at maximum count: 65,535. The event counter is asynchronous and counts each leading edge of the event comparator (except during 100 μs each minute required for resetting the counter). The event counter is transferred to EVENT_CNT [15:0] once per minute. The event comparator's threshold is set by THRS_ADJD [7:0]. OK_RD_EVENT_CNT—Bit set once per minute. Bit is set at terminal count of 599,999 on 10 KHz clock leading edge. Bit is reset when EVENT_CNT [15:0] is read.

RST_EVENT_CNT—Writing '1' resets both event counter and minute counter. The controlling computer program must first write a '1' and then write a '0' as they are latched.

THRS_ADJD [7:0]—Writes to this location sets the threshold level of the event comparator. Lowest value (0x00) corresponds to 0 of full scale; highest value (0xFF) corresponds to approximately 25% of full scale.

Referring to FIG. 1, the purpose of temperature circuit 44 is to measure the ambient temperature near the middle of the circuit board, and provide the measured temperature to FPGA 20 for interfacing to PC104, or other computer bus, computer. Temperature circuit 44 and the high voltage measurement circuit 22 supply data to temperature and high voltage measurement interface 50, which is part of FPGA 20, shown in FIG. 8.

In a preferred embodiment, high voltage measure circuit 22 may be utilized to receive the voltage from the high voltage supply biasing the radiation detector without effecting the detector signal interface and make a measurement of that voltage and provide measurement to FPGA 20 for interfacing through PC104, or other computer bus, as indicated at 14 in FIG. 1, to local computer 51 or remotely located computer 52, in FIG. 11. Thus, the high voltage supply is computer controlled and may be varied to provide a reliable voltage and/or to operate with different radiation detectors.

The purpose of power conditioning circuit 54, shown in FIG. 1, is to provide multiple ground and power plane isolation via ferrite beads and bypass capacitors, and produce voltages such as onboard +3.3V voltage not available on PC104, or other computer bus. The physical circuit is preferably laid out as multiple non-overlapping ground planes and power planes. Each is separated by ferrite beads and local bypass capacitors. The PC104, or other computer bus, bus power is used as digital power and ground, since it is an inherently digital interface. A more quiet analog power and ground are created by ferrite bead isolation and bypassing physically separated planes. The strategy used in this isolation is one of considering the frequencies of the analog and digital circuits. For low frequency systems, it is generally best to have one contiguous ground plane so that there are less DC discontinuities. For higher frequency systems, splitting the ground planes is generally preferred to suppress noise coupling between the digital and analog circuits.

Referring to FIG. 1 and FIG. 8, in one embodiment EPLD/FGPA circuit 20 may be used to perform one or more of the following non-limiting list of functions:

a. provide event counter 40 to count the number of events occurring per minute, b. provide PC104, or other computer bus, bus interface 42 to allow access to the circuit via a PC104, or other computer bus, c. provide S/H control, A/D control, Peak detect reset, Digital correlated double sample (CDS): receives pulse from event detection 34 and then proceeds through a step-wise process to measure and store the radiation event data and associated time tag, d. provide electronic memory FIFO 56 and 60—two 32 deep by 16 bit FIFOs used to store event data and time tag respectively, e. provide Time Tag generator 58—10 KHz clock generated time tag, stored with each event to indicate when it occurred (Time Tag generator 58 may be referred to herein as a clock or timer), and/or f. produce system 10 KHz clock generator 62—receives PC104, or other computer bus, bus clock and divides it down to 10 KHz, done for the purpose of keeping all boards in system synchronized for correlation of incoming radiation events.

FPGA 20 may be programmed via the PC104 bus or through a programming interface cable. FPGA 20 may be programmed locally or remotely as desired. In FIG. 8, A/D math 64 stands for analog to digital conversion mathematics, CDS 66 stands for correlated double sampler, and FIFO 56 and 60 stands for first in first out memory. The present invention preferably provides a FPGA to collect and store data. Previous designs relied on a central computer or processor to poll, sample, and store the data from the multiple boards in the system. Implementing a distributed processing methodology with memory allows each board to sample and store events independently. This results in a higher rate of measurable radiation events. It also facilitates the determination of coincident events between multiple radiation detection boards in a system by storing local time tags with each event allowing comparison between boards, e.g., for instance if the same radiation particle simultaneously impinges on detector 1, detector 2, and/or other detectors as indicated in FIG. 11.

Figure 9A:
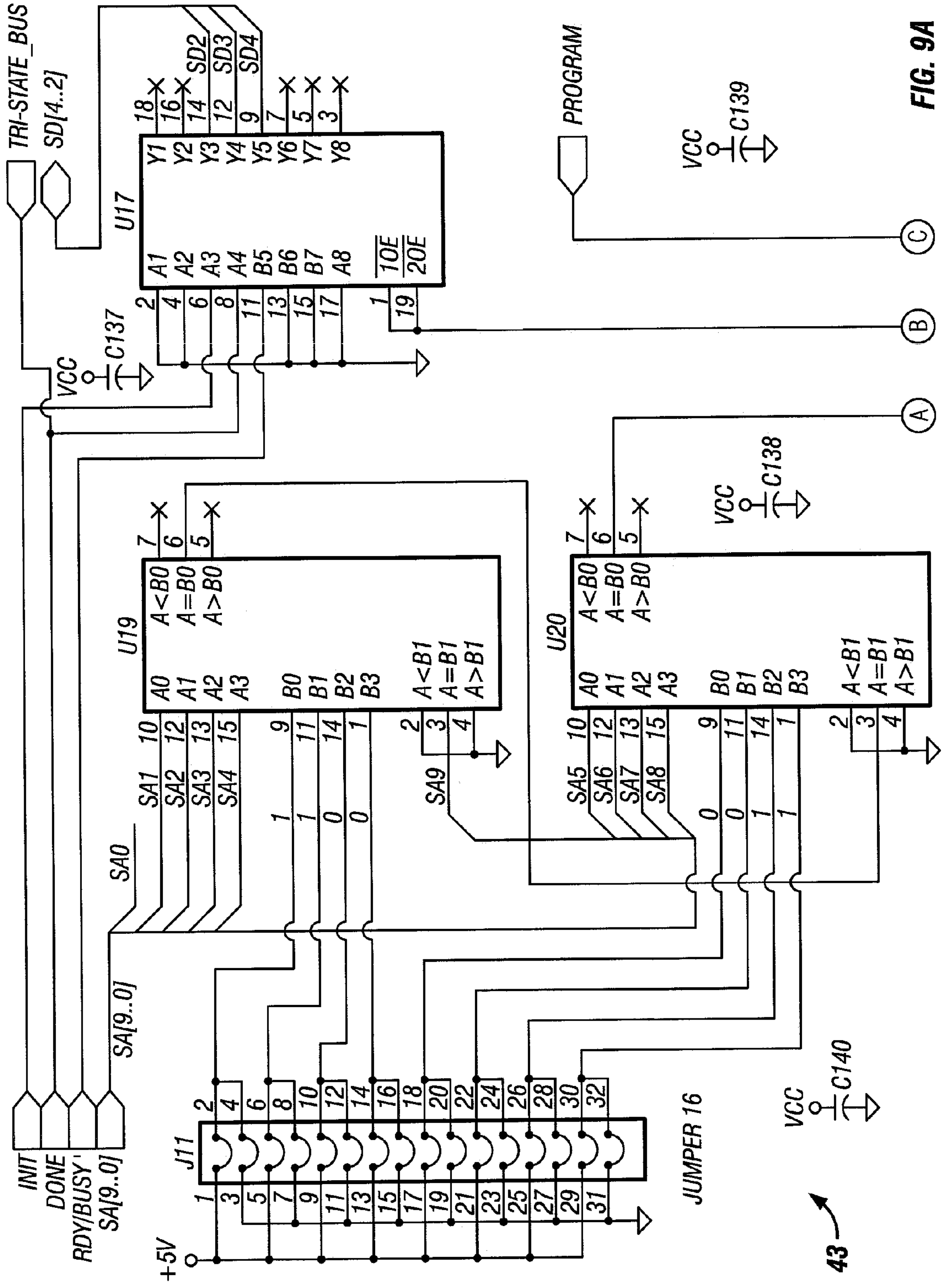
FIG. 9A is a block diagram for programming interface for the logic circuit of FIG. 8 to permit local and remote programming or reprogramming of the detector circuitry in accord with one possible embodiment of the present invention.
Figure 9B:
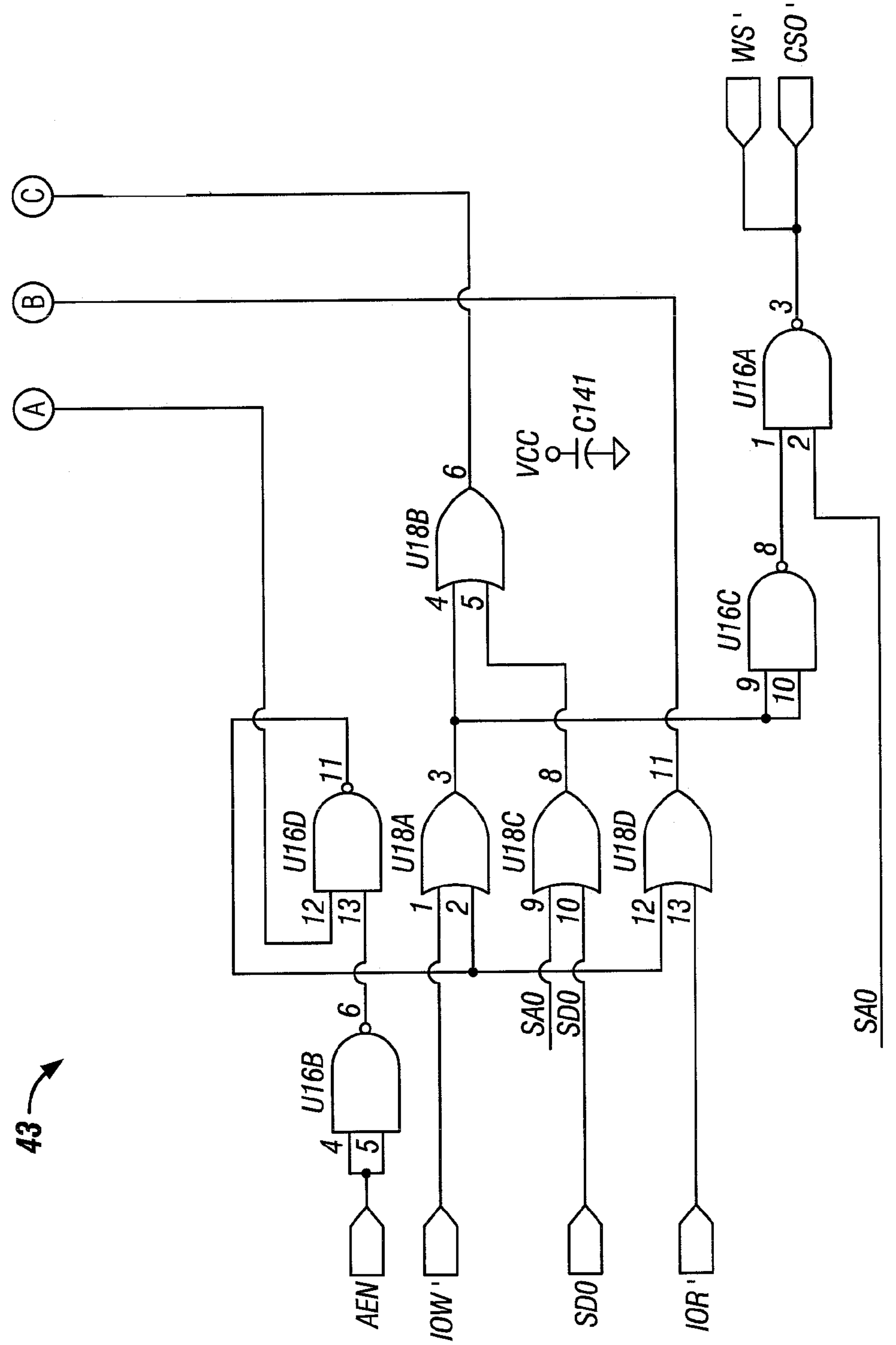
FIG. 9B is a continuation of the block diagram of FIG. 9A.
Figure 10:
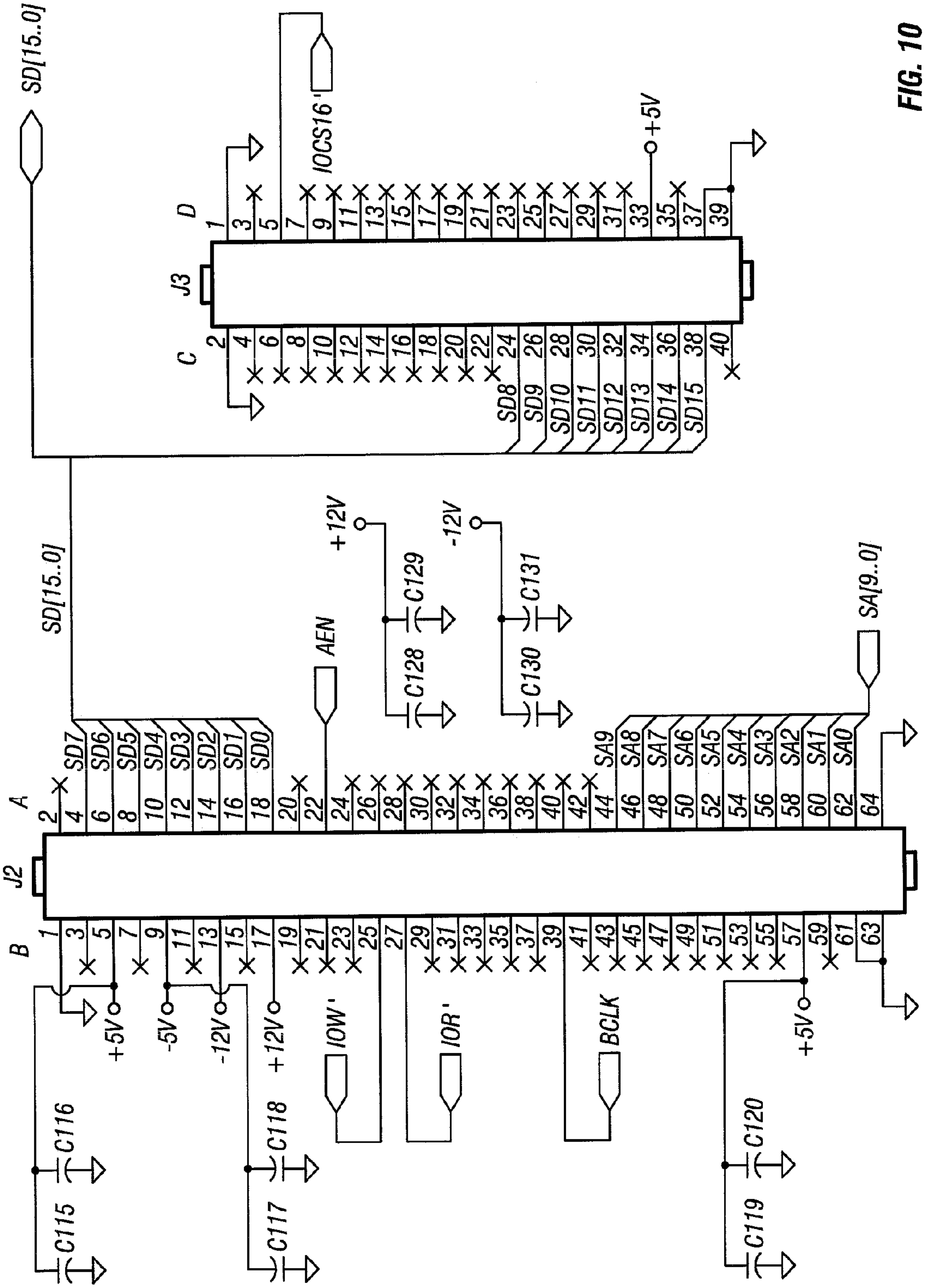
FIG. 10 a block diagram of a bus interface to permit standardized connection of the detection circuitry to other devices in accord with one possible embodiment of the present invention.

Referring now to FIG. 9A, and FIGS. 9B, and 10 there is shown FGPA programming interface 43, which may be used to perform one or more of the following non-limiting list of functions:

a) provide address decoding of the PC104, or other computer bus, bus address space, b) allow selection of different addresses for the purpose of implementing a multiple board system such as that shown in FIG. 11, c) allow programming of the FGPA from the PC104, or other computer bus, d) provide status bits to be read by the PC104, or other computer bus during programming, e) provide connection to the PC104, or other computer bus, for power, data, and control, and f) provide power bus filtering of the PC104, or other computer bus, bus power: +/−5V, +/−12V.

Standard logic parts are required for this application given that they have to be operational at turn on and without programming. J11 is used to set the address for the read and write programming port. The address is set to the base address +6 of the particular board. For example, the base address of 0x380+6 is 0x386 implemented by creating the binary number 1 1000 011X for bits 8 to 0 (SA8 to SA0). Bit 0 and Bit 9 are not included in the setting of the address.

One preferred embodiment of radiation detection system 10 allows ground controllers to upload firmware revisions or modifications to support various mission objectives. It also allows possible corrupted firmware files to be replaced with ones of known integrity.

As shown in FIG. 10, the present invention may employ a 16 bit bus and may preferably use I/O-mapped I/O. All power supply voltages, +/−5V and +/−12V are used in the design and are required to be present on the bus.

As shown in FIG. 10, the present invention preferably utilizes an industry standard PC104, or other computer bus, bus interface. This increases its utility for use in various systems and for both space applications as well as terrestrial applications as indicated in FIG. 11. It also allows multiple circuit boards to be stacked together or deleted from the system to make a customizable suite of radiation detection circuits wherein the present invention can support various radiation detectors. By utilizing the PC104 bus standard, other instruments employing this bus, could be included in the same instrument if desired. It also provides for inclusion of various communications interfaces that can be added or removed by simply changing the types of cards/circuit board that make up the instrument. PC104 was chosen as an industry standard bus in order to take advantage of commercial industry components thereby providing lower cost, higher reliability, and ease of upgrade migration.

In operation, radiation detection circuit 10 interfaces to various types of radiation detectors 12 and provide radiation events data to a PC104 computer bus interface 14. The single channel circuits can be stacked together in a PC104 bus stack to create a multiple detector system as indicated in FIG. 11.

High voltage 16 biases radiation detector 12 from 0 to −1000V and may be monitored controlled by a remote or local computer through bus 14. Readings from high voltage measurement circuit 22 are read by PC104 computer to verify correct setting. Radiation detector 12 produces pulses in response to radiation with a pulse width in 1 to 10 ns range. Charge to Voltage Conversion/Integrator 24 receives incoming charge from detector and creates voltage by integrating charge across a small capacitor.

Integrator 24 extends the pulse width of pulses from detector input of approximate 5 ns to integrator 24 output of approximately 200 ns before appreciable droop or discharge of the capacitor. Integrator 24 produces the ‘area under the curve’ to represent the total charge that has been produced by the radiation event in the detector.

Peak Detect Circuit 32 receives the signal from integrator 24 and holds the detected peak voltage created from the integrated charge. Peak detect circuit 32 produces signal that last long enough in time to be able to be sampled by Sample & Hold circuit 36. Peak detector circuit 32 extends 200 ns pulse out of integrator 24 to 200 μs pulse. A reset signal is received by FPGA 20 to create a baseline reset value between each sample. The difference between the baseline reset value and the peak voltage is presently the most preferred embodiment measurement for a corrected peak voltage. Thus, the measurement is compensated for any baseline drift utilizing correlated double sampling techniques.

Sample & Hold circuit 36 takes a sample of the signal from peak detector circuit 32 and holds it for the duration of the analog to digital conversion. Sample & hold circuit 36 extends the 200 μs pulse from the peak detector circuit 32 to one required for the analog to digital conversion to complete.

Analog to digital conversion circuit 38 receives analog signal from sample & hold circuit 36 and converts it to 16 bit digital number. This circuit also exchanges control signals for conversion start and end with FPGA 20. Analog to digital conversion circuit is also used to quantify both the data value and the reset value for digital correlated double sampling. In other words, the difference between the two values is the value for use.

Event detection w/hysteresis 34, THRS_ADJD [7:0] in FIG. 8, may be used to set a threshold detection level of 0 to 25% of maximum circuit dynamic range, which may be adjusted by FGPA 20 to select events detected. Hysteresis is employed to suppress false triggering on noisy rising edges of detector pulse by effectively providing two triggering points, a leading edge trigger and a trailing edge trigger. An event pulse is supplied to FPGA 20 for two purposes: start of data gathering process for event, and counting of number of events occurring per minute. Event detection circuit 34 also causes the storing of time tags with each measured and stored radiation event.

Temperature circuit 44 may be used to measure and provides temperature to FPGA 20 for interfacing to PC104 computer. High Voltage Measurement circuit 22 measures and provides high voltage measurement to FPGA for interfacing to PC104 computer. Power conditioning circuit 54 provides multiple ground and power plane isolation. Power conditioning circuit 54 may also be used to produce onboard voltages not available on PC104 bus and/or provide bypass capacitors for PC104 bus power lines.

EPLD/FPGA 20 includes event counter 40, which counts the number of events occurring per minute. Bus Interface 42 allows access to the circuit via a PC104, or other computer bus, bus. State machine(s) 68 provides S/H control for circuit 36, A/D control for circuit 38, peak detect reset for circuit 32, and recording of the digital correlated double sample (CDS). State machine(s) 68 thus acts as a data collection control circuit. FPGA 20 receives pulse from event detection 34 and then proceeds through a step-wise process to measure and store the radiation event data and associated time tag. FIFO 56 and 60 are two 32 deep by 16 bit FIFOs used to store event data and time tag respectively. Time Tag 58 provides a 10 KHz clock generated time tag stored with each event to indicate when it occurred. Clock 62 provides the 10 KHz Clk by receiving the PC104, or other computer bus, bus clock and dividing it down to 10 KHz. PC104, or other computer bus, Bus Interface 42 provides address decoding and data routing as well as a connection to the PC104, or other computer bus, bus for power, data, and control.

Thus, while the preferred embodiment of radiation detector circuit 10 is disclosed in accord with the law requiring disclosure of the presently preferred embodiment of the invention, other embodiments of the disclosed concepts may also be used. In one preferred embodiment, radiation hardened components may be utilized. While values may be given for components, it will be understood that component types and values for resistors, capacitors, integrated circuits, and the like may be varied depending on the application without changing the principal of operation discussed hereinbefore. Therefore, the foregoing disclosure and description of the invention are illustrative and explanatory thereof, and various changes in the method steps and the details of the apparatus may be made within the scope of the appended claims without departing from the spirit of the invention.

What is claimed is:

1. A method for detecting charged particle radiation or uncharged radiation that impinge on a radiation detector, said radiation detector producing pulses of electrical charge, said method comprising:

providing a circuit comprised of a first node and a second node and further comprising a capacitance between said first node and said second node;

connecting said circuit to said radiation detector such that said electrical charge produces a voltage across said capacitance at said first node;

providing an amplifier and connecting an amplifier input to said first node;

configuring said amplifier to produce output voltage pulses at an amplifier output in response to said pulses of electrical charge wherein a peak voltage of said output voltage pulses represents an energy in said charged particle radiation or uncharged radiation;

providing a current feedback loop from said amplifier output to said amplifier input such that said current feedback loop supplies a current error signal to said amplifier input; and placing an operational amplifier in series with said feedback loop from said amplifier output to said amplifier input.

2. The method of claim 1, further comprising providing resistance between said first node and said second node such that said resistance is in parallel with said capacitance and such that a DC current error signal passes through said resistance to said amplifier input.

3. The method of claim 1, further comprising selecting a magnitude of said resistance such that a discharge rate of said capacitance is much slower than an anticipated pulse width of said pulses of electrical charge.

4. The method of claim 1, further comprising selecting said capacitance to produce a desired peak output voltage $V_o$ for a respective radiation event in terms of volts per energy such that:

$$Vo = \frac{E \cdot e \cdot 10^6}{Cf \cdot \varepsilon},$$

where

E is the energy of said charged particle radiation or uncharged radiation in Mega electron voltages (MeV), e is the charge of an electron ($1.6\times10^{-19}$ coulombs), the $10^6$ converts MeV to eV, $\epsilon$ is the detector's required energy, in eV, to produce an electron-hole pair (3.62 is a typical value for certain solid state detectors employed at 300° K), and $C_f$ is said capacitance.

5. The method of claim 1, further comprising:

applying said peak voltage to a peak voltage detection circuit to produce an analog detected peak voltage, and converting said analog detected peak voltage to a peak voltage digital value.

6. The method of claim 5, further comprising:

resetting said peak voltage detection circuit to an analog base value, converting said analog base value to a base value digital voltage, and determining a corrected peak voltage reading utilizing said peak voltage digital value and said base value digital voltage.

7. The method of claim 5, wherein said peak detection circuit is operable to produce a maximum dynamic range of said analog detected peak voltage and said converting step utilizes sufficient bits such that said peak voltage digital value has a resolution of said maximum dynamic range divided by at least 5,500.

8. The method of claim 5, further comprising:

utilizing said voltage pulses at said amplifier output for producing an event detection signal when a threshold voltage is reached;

utilizing said event detection signal to start a timing routine which produces a start signal to start said converting step of said analog detected peak voltage to said peak voltage digital value; and after said converting step then providing that said timing routine produces a reset signal to reset said peak voltage detection circuit to an analog base value.

9. The method of claim 8, wherein said timing routine is implemented with a state machine.

10. The method of claim 8, further comprising counting a number of said event detection signals produced during a selected period of time.

11. The method of claim 8, further comprising:

providing a tag time for storing an associated time with said peak voltage digital value, and providing memory for storing a plurality of said peak voltage digital values with a plurality of said associated time tags.

12. The method of claim 11, further comprising:

counting a number of said event detection signals produced during a period of time, providing a bus for connection to a computer to transfer said plurality of said peak voltage digital values with a plurality of said associated time tags, and said stored number for one or more of said periods of time.

13. The method of claim 1, further comprising:

utilizing said voltage pulses at said amplifier output for producing an event detection signal when a predetermined analog value leading edge threshold voltage is reached; and subsequently preventing another event detection signal from being produced until an analog value trailing edge threshold voltage is reached.

14. The method of claim 13, further comprising:

producing said predetermined analog value leading edge threshold voltage by converting from digital to analog a predetermined digital value leading edge threshold voltage.

15. The method of claim 14, further comprising:

reprogramming to produce an updated analog value leading edge threshold voltage by method steps comprising producing an updated digital value leading edge threshold voltage and transferring said updated digital value leading edge threshold voltage through a standard bus connection to a logic circuit.

16. The method of claim 1, further comprising:

providing a high voltage circuit to supply a first high voltage to said radiation detector, utilizing software in a computer to select a second high voltage for supply to said radiation detector, communicating through a standard bus to change said high voltage circuit to supply said second high voltage to said radiation detector.

17. The method of claim 1, further comprising producing said output voltage pulses at said amplifier output to have a pulse width of approximately 50 to 300 ns before appreciable droop.

18. A radiation processing circuit operable for detecting charged particle radiation or uncharged radiation that impinge on a radiation detector, said radiation detector producing electrical pulses, said electrical pulses comprising an amount of electrical charge that corresponds to an amount of energy in said charged particle radiation or uncharged radiation, said radiation processing circuit comprising:

a parallel circuit comprising a capacitance in parallel with a resistance, said parallel circuit comprising a first end and second end, said first end being electrically connected to said radiation detector for receiving said electrical pulses and for producing a voltage across said capacitance;

an amplifier with an amplifier input connected to said first end of said parallel circuit, said amplifier being configured to produce an output voltage at an amplifier output in response to said voltage across said capacitor;

a feedback loop for said amplifier which connects said amplifier output to said amplifier input, said parallel circuit being connected in series with said feedback loop such that a current error feedback signal is directed from said second end of said parallel circuit to said first end of said parallel circuit and then to said amplifier input, wherein said feedback loop comprises a DC feedback loop through said resistance; and an operational amplifier in series with said feedback loop from said amplifier output to said amplifier input, said operational amplifier producing said current error signal for application to said second end of said parallel circuit.

19. The radiation processing circuit of claim 18, further comprising said resistance parallel to said capacitance comprising a magnitude and acting to discharge said capacitance at a discharge rate, said magnitude being such that said discharge rate is much slower than an anticipated pulse width of said electrical pulses.

20. The radiation processing circuit of claim 18, further comprising said first end of said parallel circuit being electrically connected to said radiation detector in a configuration such that said voltage across said capacitance is proportional to said energy in said charged particle radiation or uncharged radiation for a respective of said electrical pulses.

21. The radiation processing circuit of claim 18, wherein said amplifier is configured to produce output voltage pulses at said amplifier output which are proportional in magnitude to said energy in said incident radiation for a respective of said electrical pulses.

22. The radiation processing circuit of claim 21, further comprising:

a peak detect circuit operable to produce an analog detected peak voltage from said output voltage pulses at said amplifier output, said peak detect circuit comprising an electronic switch responsive to a reset signal to reset said peak detect circuit to produce an analog base value, and an analog to digital converter operable to produce a digital detected peak voltage from said analog detected peak voltage.

23. The radiation processing circuit of claim 22, further comprising:

a timing circuit operable to provide a start signal to start operation of said analog to digital converter to produce said digital detected peak voltage, said timing circuit being operable to subsequently produce said reset signal to reset said peak detect circuit to produce said analog base value, said timing circuit being operable to initiate operation of said digital converter to produce a digital base value from said analog base value.

24. The radiation processing circuit of claim 23 wherein said analog to digital converter utilizes sufficient bits such that said digital detected peak voltage has a resolution to a maximum voltage range of said analog detected peak voltage divided by at least 65,500.

25. The radiation processing circuit of claim 21, further comprising:

an event detector circuit to produce an event signal, said event detector circuit comprising a comparator, said event detector circuit further comprising a leading edge threshold circuit operable for converting a first digital leading edge threshold value into a first analog leading edge threshold voltage, said comparator being operable for producing said event signal in response to said output voltage pulses at said amplifier output and said first analog leading edge threshold voltage.

26. The radiation processing circuit of claim 25, further comprising said comparator being configured such that a trailing edge threshold voltage must be triggered before said comparator produces a subsequent event signal.

27. The radiation processing circuit of claim 25, further comprising:

a state machine operable for receiving said event signal, a peak detect circuit operable to produce an analog detected peak voltage, said peak detect circuit being operably connected to said amplifier output, an analog to digital converter operably connected to said peak detect circuit, a timer for producing a time tag, and a memory for storing digital data, wherein said state machine begins a data collection operation after receiving said event signal, said state machine being operable for producing control signals for starting said analog to digital converter to sample said analog detected peak voltage and thereby produce a digital detected peak voltage, said state machine producing signals for transferring said digital detected peak voltage value to said memory and for producing a time tag for association with said digital detected peak voltage and for storing said time tag in said memory.

28. The radiation processing circuit of claim 27, further comprising:

a computer operably connected to said leading edge threshold circuit through a standard bus, said computer and said standard bus being configured such that said computer is operable to reprogram said leading edge threshold circuit and provide a second digital leading edge threshold value for producing a second analog leading edge threshold voltage.

29. The radiation processing circuit of claim 28, further comprising said computer being operable for transferring said digital detected peak voltage and said time value for said digital detected peak voltage from said memory to said computer through said standard bus.

* * * * *